United States Patent
Cohen et al.

(10) Patent No.: US 6,859,776 B1
(45) Date of Patent: Feb. 22, 2005

(54) METHOD AND APPARATUS FOR OPTIMIZING A SPOKEN DIALOG BETWEEN A PERSON AND A MACHINE

(75) Inventors: Michael H. Cohen, Burlingame, CA (US); Tracy D. Wax, Burlingame, CA (US); Michael A. Prince, Los Altos, CA (US); Steven C. Ehrlich, Burlingame, CA (US)

(73) Assignee: Nuance Communications, Menlo Park, CA (US)

( * ) Notice: Subject to any disclaimer, the term of this patent is extended or adjusted under 35 U.S.C. 154(b) by 0 days.

(21) Appl. No.: 09/412,173

(22) Filed: Oct. 4, 1999

Related U.S. Application Data

(63) Continuation-in-part of application No. 09/203,155, filed on Dec. 1, 1998.

(51) Int. Cl.[7] ............................................. G10L 21/00
(52) U.S. Cl. ..................... 704/270; 704/270.1; 704/275
(58) Field of Search ............................. 704/270, 270.1, 704/275

(56) References Cited

U.S. PATENT DOCUMENTS

| | | | |
|---|---|---|---|
| 4,348,550 A * | 9/1982 | Pirz et al. ............... | 379/355.06 |
| 4,887,212 A | 12/1989 | Zamora et al. | |
| 4,974,191 A | 11/1990 | Amirghodsi et al. | |
| 5,442,780 A | 8/1995 | Takamashi et al. | |
| 5,548,631 A | 8/1996 | Krebs et al. | |
| 5,603,031 A | 2/1997 | White et al. | |
| 5,608,624 A | 3/1997 | Luciw | |
| 5,689,669 A | 11/1997 | Lynch et al. | |
| 5,692,187 A | 11/1997 | Goldman et al. | |
| 5,754,770 A * | 5/1998 | Shiels et al. ............... | 364/514 |
| 5,774,860 A * | 6/1998 | Bayya et al. ............... | 700/246 |
| 5,790,044 A | 8/1998 | Lin et al. | |
| 5,809,269 A * | 9/1998 | Favot et al. ............... | 704/231 |
| 5,905,773 A * | 5/1999 | Wong ............... | 379/88.03 |
| 5,915,001 A | 6/1999 | Uppaluru | |
| 6,098,043 A * | 8/2000 | Forest et al. ............... | 379/88.01 |
| 6,108,629 A * | 8/2000 | Kasday ............... | 704/258 |
| 6,178,404 B1 * | 1/2001 | Hambleton et al. ............... | 379/88.16 |
| 6,233,556 B1 | 5/2001 | Teunen et al. | |
| 6,233,559 B1 * | 5/2001 | Balakrishnan ............... | 704/270.1 |
| 6,240,448 B1 * | 5/2001 | Imielinski et al. ............... | 379/90.01 |
| 6,246,981 B1 * | 6/2001 | Papineni et al. ............... | 704/235 |
| 6,400,806 B1 * | 6/2002 | Uppaluru ............... | 379/88.02 |
| 6,487,534 B1 * | 11/2002 | Thelen et al. ............... | 704/270 |
| 6,493,671 B1 * | 12/2002 | Ladd et al. ............... | 704/270 |
| 6,493,673 B1 * | 12/2002 | Ladd et al. ............... | 704/275 |
| 6,501,832 B1 * | 12/2002 | Saylor et al. ............... | 379/88.04 |
| 6,522,875 B1 * | 2/2003 | Dowling et al. ............... | 455/414.3 |
| 6,539,359 B1 * | 3/2003 | Ladd et al. ............... | 704/275 |
| 6,560,576 B1 * | 5/2003 | Cohen et al. ............... | 704/270 |

* cited by examiner

*Primary Examiner*—Susan McFadden
*Assistant Examiner*—Michael N. Opsasnick
(74) *Attorney, Agent, or Firm*—Blakely, Sokoloff, Taylor & Zafman LLP

(57) ABSTRACT

A network comprises a number of speech-enabled sites maintaining a number of voice pages. A central server on the network executes a voice browser which provides users with access to the sites using voice-activated hyperlinks. The server also maintains and brokers information associated with the users based on spoken dialogs between the users and the sites. In response to a user accessing a given ASR site, information about that user is provided by the server for use by that ASR site. The information is used by the ASR site to optimize a spoken dialog between the user and the ASR site by reducing the amount of information the user is required to provide during the dialog. Information about the user can thereby be shared between separate speech enabled sites, in a manner which is transparent to the user, in order to expedite the user's interaction with those sites.

13 Claims, 15 Drawing Sheets

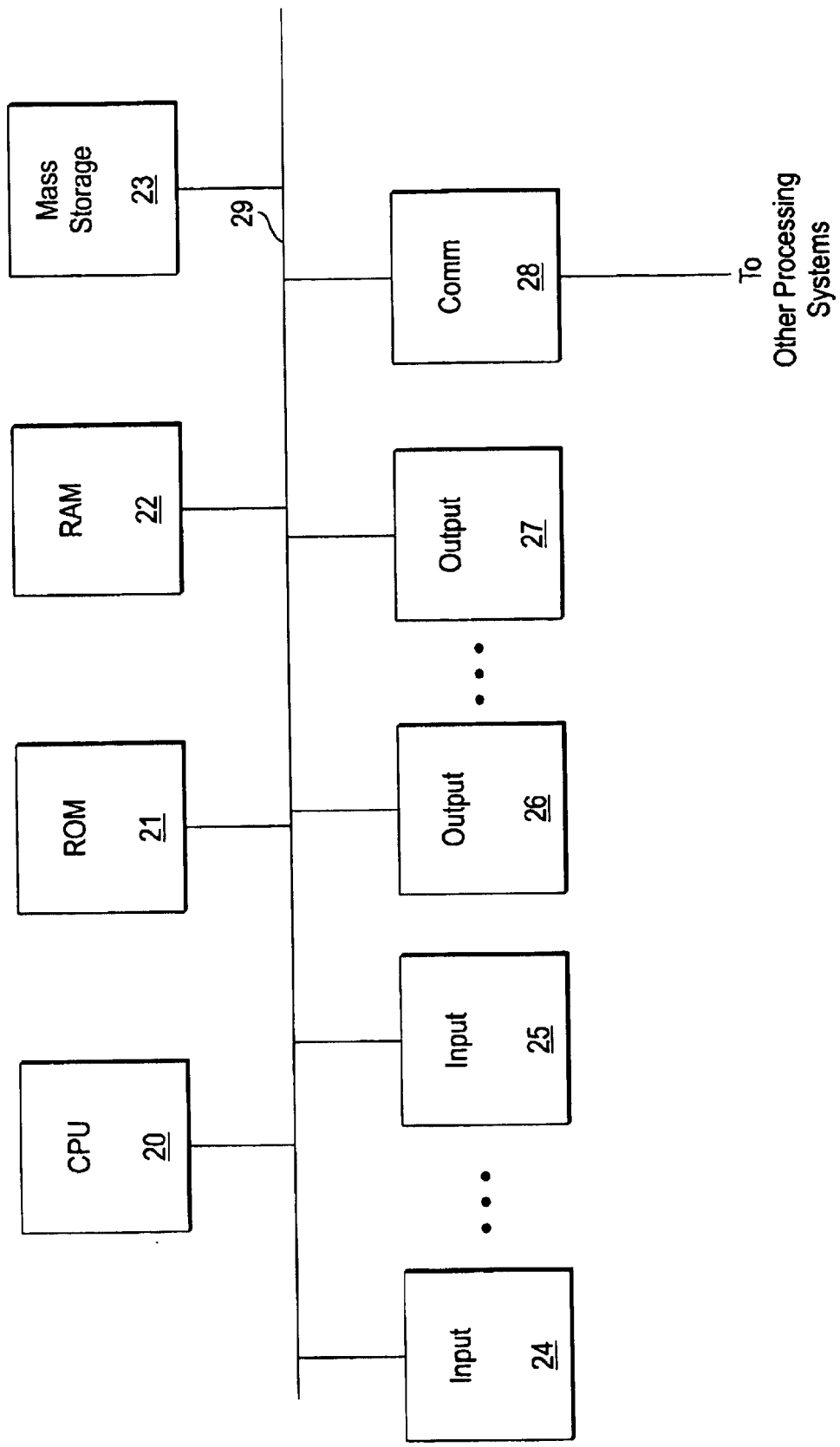

METHOD AND APPARATUS FOR OPTIMIZING A SPOKEN DIALOG BETWEEN A PERSON AND A MACHINE

This is a continuation-in-part of U.S. patent application Ser. No. 09/203,155, entitled, "System and Method for Browsing a voice Web," filed on Dec. 1, 1998.

FIELD OF THE INVENTION

The present invention pertains to speech recognition systems. More particularly, the present invention relates to a method and apparatus for improving a spoken dialog between a human user and a machine.

BACKGROUND OF THE INVENTION

A variety of services are available over the telephone network. In the past, these services required a human operator. With the introduction of touch tone telephones, the caller could make selections and provide information using the telephone buttons. Subsequent developments have allowed users to make selections and provide information using natural speech recognition. Such an interface generally makes it much easier for the user to gain access to such services. Examples of technology to implement such a voice-based system are found in U.S. patent application entitled, "A System Architecture for and Method of Voice Processing," Ser. No. 09/039,203, filed on Mar. 31, 1998, and in U.S. patent application entitled, "Method of Analyzing Dialogs in a Natural Language Speech Recognition System," Ser. No. 09/105,837, filed on Jun. 26, 1998, and also in provisional patent application entitled, "A Method and Apparatus for Processing and Interpreting Natural Language in a Voice Activated Application," Ser. No. 60/091,047, filed on Jun. 29, 1998, each of which is incorporated herein by reference in its entirety.

With the advent of natural language automatic speech recognition (ASR) systems, users could respond to interactive telephone systems using more natural spoken responses. Such systems are used for a variety of applications. One example of how ASR systems may be used is to provide information and services regarding flight availability, flight times, flight reservations and the like for a predetermined airline. Another possible use for such systems is acquiring information regarding stocks, bonds and other securities, purchasing and selling such securities, and acquiring information regarding a user's stock account. Also, systems exist for controlling transactions in accounts at a bank. Other applications are also available.

While ASR systems provide a dramatic improvement over other voice information and voice services systems, they still have drawbacks. Generally, each such system accessed by a user requires that the user make a separate telephone call. Often, information exists on related topics. For example, in the event a user contacts a voice service to obtain airline information and travel tickets, they may also desire a hotel room and dinner reservations in the destination city. Even if hotels are located in the destination city that provide a voice system of room rate and availability information and allow callers to reserve rooms automatically or manually, the user must hang up the telephone after making the airline reservations, determine the telephone number for a hotel in the destination city, and only then place the desired call to the hotel. This procedure is cumbersome at best. The procedure can be dangerous if undertaken from an automobile in commute hour traffic.

Other automatic information and service systems are also available. For example, the World Wide Web ("the Web"), which is implemented on computers connected to the Internet, is a rapidly expanding network of hyperlinked information which provides users with numerous services and information on a variety of topics. Unlike the voice systems discussed above, the Web is primarily a visually-based system which allows a user to graphically interact with an image or series of images on a display screen.

The Web offers many advantages over other media. The Web seamlessly links information stored on geographically distant servers together. Thus, users are capable of seamlessly accessing information stored on geographically distant servers. When the user accesses information on a server, the user interfaces with the server through a website. Many websites offer hyperlinks to other websites, which tends to make the Web user-friendly. When a current website has a hyperlink to another website, the user is enabled to jump directly from a current website to this other website without entering an address of this other website. In use, a hyperlink is a visually discernable notation. The user activates the hyperlink by "clicking" on the hyperlink notation or icon also called point-and-click. The user's computer is programmed to automatically access the website identified by the hyperlink as a result of the user's point-and-click operation.

Unfortunately, Web-based techniques have thus far not been readily applicable to a voice system. On the Web, a display page typically remains on the user's display screen until the user activates a hyperlink. This allows the user ample opportunity to carefully read all the images on the display screen as many times as desired before making an appropriate point-and-click choice. With a voice system, once the message is spoken it cannot be readily reviewed by the user. Thus, there is no previously known analogous operation to point-and-click in a voice system. Further, hyperlinking is not available for voice systems. Telephone calls are made through the central office on a call-by-call basis. In contrast, on the Web, once connected computers are functionally connected to all Internet addresses concurrently. Different sites are accessed by requesting information which is located at different addresses. At least these differences make ordinary Web-based techniques inapplicable to a voice system. What is needed, therefore, is a system for browsing a voice-based network.

The PSTN (Public Switched Telephone Network) provides the ability for more than 800 million individual stations to make any pairwise connection by one party (the originator) dialing the telephone number of another party (the receiver). A station can be any person with a telephone, an ASR system, or an information service, among others. The current approach has two disadvantages. First, the originator must know of the existence of the receiver. There is no easy way to browse or discover information or receivers that may be of interest to the originator. Second, the originator must know the telephone number of the receiver. Furthermore, from the telephone there is no convenient way to browse Web pages that may or may not be audio enabled. Additionally, there is no integration between the PSTN and the Web that would allow seamless browsing of both as an integrated web.

Other problems are also associated with ASR systems, one of which is bandwidth. Specifically, audible communication is an inherently low-bandwidth mode of communication in comparison to visual communication. For example, most people can listen to and mentally process only a single stream of spoken words at a time, and only up to a limited rate of speech. On the other hand, most people can effectively see and process a number of different objects or events simultaneously. Hence, the amount of information a person can acquire from, or provide to, a voice based information system in a given period of time is very limited in comparison to a visually based information system, such as the Web. Therefore, it is crucial in a voice based system to be able to communicate as much information as possible in as little time as possible.

In addition, audible communication by its very nature tends to be very transitory, in contrast with visual information such as a Web page, which is more persistent. Thus, many people are more likely to forget information that is perceived audibly than information that is perceived visually. Exacerbating these problems is the fact that many people dislike communicating with machines and therefore do not wish to spend any more time than is necessary engaged in a dialog with a machine. Therefore, what is further needed is a technique for optimizing a spoken dialog between a person and a machine to overcome these and other problems.

SUMMARY OF THE INVENTION

The present invention includes a method and apparatus for facilitating interaction between a human user and a processing system. Information associated with the user is received at the processing system, and the information is then used to optimize a spoken dialog between the user and the processing system. The processing system may be a speech-enabled site on a network. The information associated with the user may be received from a central server on the network, which may function as a broker that selectively distributes such information and other services on behalf of speech-enabled sites on the network. This technique can be used to reduce the amount of information a user is required to provide to a speech-enabled site during a spoken dialog, shortening the length of the dialog and reducing the audio cues necessary for conducting a transaction for presenting information. The technique enables the exchange of information between independent speech-enabled sites on a network, which facilitates seamless browsing of the sites by a user. Further, with this technique, the use of a speech recognition based system is made quicker and more pleasant for users.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 1C is a block diagram showing the components of a computer system that may be used to implement the voice browser and other systems described herein;

DETAILED DESCRIPTION

Figure 1A:
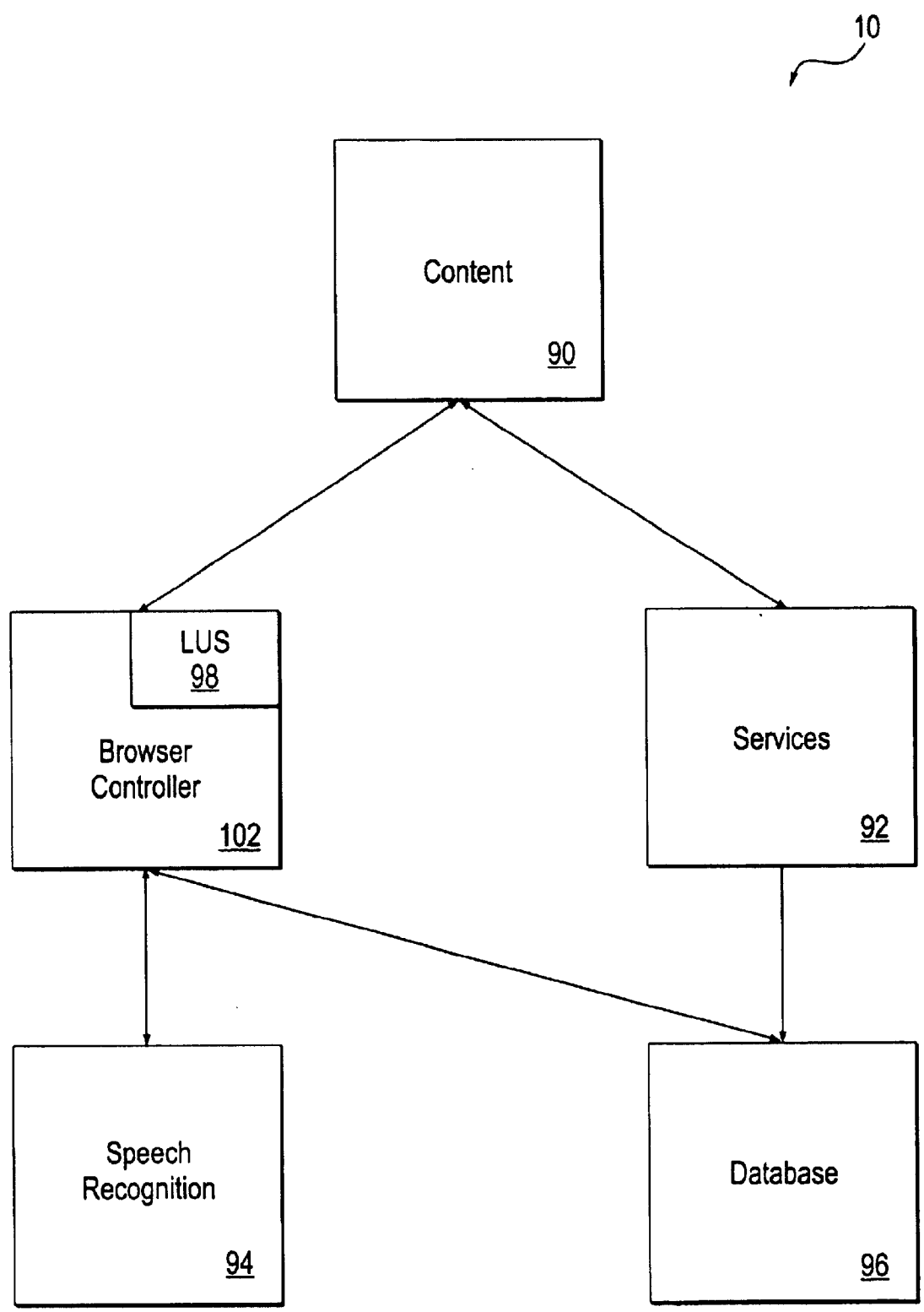
FIG. 1A is a block diagram illustrating the components of a voice browser.

A method and apparatus are described for optimizing a spoken dialog between a person and a speech-enabled site (i.e., a site which has speech recognition capability) on a network. The present invention relates to a system including a voice-activated browser that is designed to allow a user to request, navigate, retrieve, and store information from a network of telephone stations, ASR stations, Interactive Voice Response (IVR) stations, speech-enabled world wide web ("Web") pages, and conventional (non-speech-enabled) Web pages. This complete set of telephone numbers and uniform resource locators (URLs) is referred to in this description as "voice pages" or simply "content". Note that voice pages may also include information obtained through other means.

Voice pages that have been designed to operate cooperatively with the browser as well as all conventional Web pages can take advantage of the features described herein, including hyperlinking. These voice pages will link to other voice pages to form a network. Conventional telephone stations are also part of this network, as well as any addressable device capable of receiving information usable by the browser. The various voice web pages are capable of being linked together to form the network of voice web pages by having a browser which can connect to any voice web page, whether it is a telephone number on the PSTN or a URL on the Web or anything else.

Several principal uses are contemplated for the system described herein. First, is contemplated that users will generate specific applications that include voice pages or Web pages that are configured to take advantage of the described voice browsing capability. In addition, the described system also includes the capability to allow access to the more than 800 million already existing conventional telephone nodes and voice pages in addition to world wide web pages that can be read by a text-to-speech converter. This is true regardless of whether or not the intended recipient of the call is aware of the existence of the described system. Thus, a user can access any of a plurality of known telephone numbers, ASR systems, voice information services, or Web pages which were not designed to take advantage of the voiced-activated browser, and a user can also access voice pages or Web pages designed with the voice-activated browser in mind. When accessing a voice page designed according to the techniques described herein, the user will be presented with hyperlink options to other telephone numbers or URLs. When accessing other types of telephone numbers, including a conventional telephone set, an ASR system, an IVR system or a voice information service, hyperlink capability may not be present. Nonetheless, certain features of the described system may still be available to the caller. For example, a caller (user) may return to his "start page", return to a previous page or visit a bookmarked voice page.

One aspect of the described system is that the browser maintains and brokers information associated with users, as well as other information, on behalf of other connected sites. As described in greater detail below, when a user accesses a given speech-enabled site via the browser, the browser may provide the accessed site with information about the user or other information which it maintains or to which it has access. The information can be provided in a manner which is transparent to the user. The information may have been acquired from the user through one or more previous spoken dialogs between the user and speech-enabled sites on the network. The information can then be used by the site to optimize a spoken dialog between the site and the user. More specifically, the information provided by the browser can be used by the site to reduce the amount of information the user is required to speak during the dialog, shortening the length of the dialog and reducing the audio cues necessary for conducting a transaction or presenting information. Such optimization is crucial in the audio environment, in which information is generally communicated sequentially, in contrast with a visual information such as the Web. Thus, arbitrary information can be effectively shared between separate speech-enabled sites on the network, in a manner which can be made transparent to the user, in order to expedite the user's interaction with those sites.

I. Voice-Activated Browser

The voice activated browser described below is also described in U.S. patent application Ser. No. 09/203,155, entitled, "System and Method for Browsing a Voice Web," filed on Dec. 1, 1998, which is incorporated by reference herein in its entirety. The voice-activated browser may be implemented as software that can be executed on one or more computer systems, and it is primarily described as such herein. In at least one embodiment, the browser is embodied as code written in the Java programming language. Note, however, that the browser may alternatively be implemented using hardwired circuitry, or as a combination of hardwired circuitry and software. Accordingly, the browser and other features of the present invention are not limited to any particular combination of hardware and/or software.

Refer now to FIG. 1A, which shows the components of a voice-activated browser providing the above-mentioned capabilities, according to at least one embodiment. As shown, the browser 10 includes five major subsystems: content 90, services 92, a speech recognition engine 94, a database 96, and a browser controller 102. The browser controller 102 includes a lookup service (LUS) 98, which is described further below. The browser controller 102 is the core of the browser 10. The browser controller 102 executes and/or hosts content, facilitates navigation, provides access to the appropriate communication channel, and performs wake-up word recognition. Content 90 is the markup language (ML), objects representing dialogs, grammars, and prompts which the browser 10 uses to generate a spoken interaction with a caller. The user interface of the browser 10 is implemented as content 90. Services 92 are used by content 90 to exchange data. Content 90 uses the lookup service 98 to register and discover services. In at least one embodiment, the browser controller 102 is designed to incorporate the functionality of the Jini software system, developed by Sun Microsystems, which is described in detail in *The Jini Specification*, Sun Microsystems, Addison-Wesley, June 1999, which is incorporated herein by reference in its entirety. Accordingly, in such embodiments, the lookup service 98 is a lookup service as specified for the Jini system. Further, in such embodiments a 'service' may be essentially any entity that can be used by a person, a program, or another service. Therefore, services 92 may include computations, storage, a communication channel to another user, the software filter, a hardware device, or another user. The speech recognition engine 94 performs standard natural speech recognition functions, such as are known in the art. The speech recognition engine 94 may be exposed through a communication channel application program interface (API). In at least one embodiment, the browser 10 is embodied in software, using the Java programming language. Hence, the database 96 may be a scripted query language (SQL) relational database management system (RDBMS), accessed through Java database connectivity (JDBC).

Figure 1B:
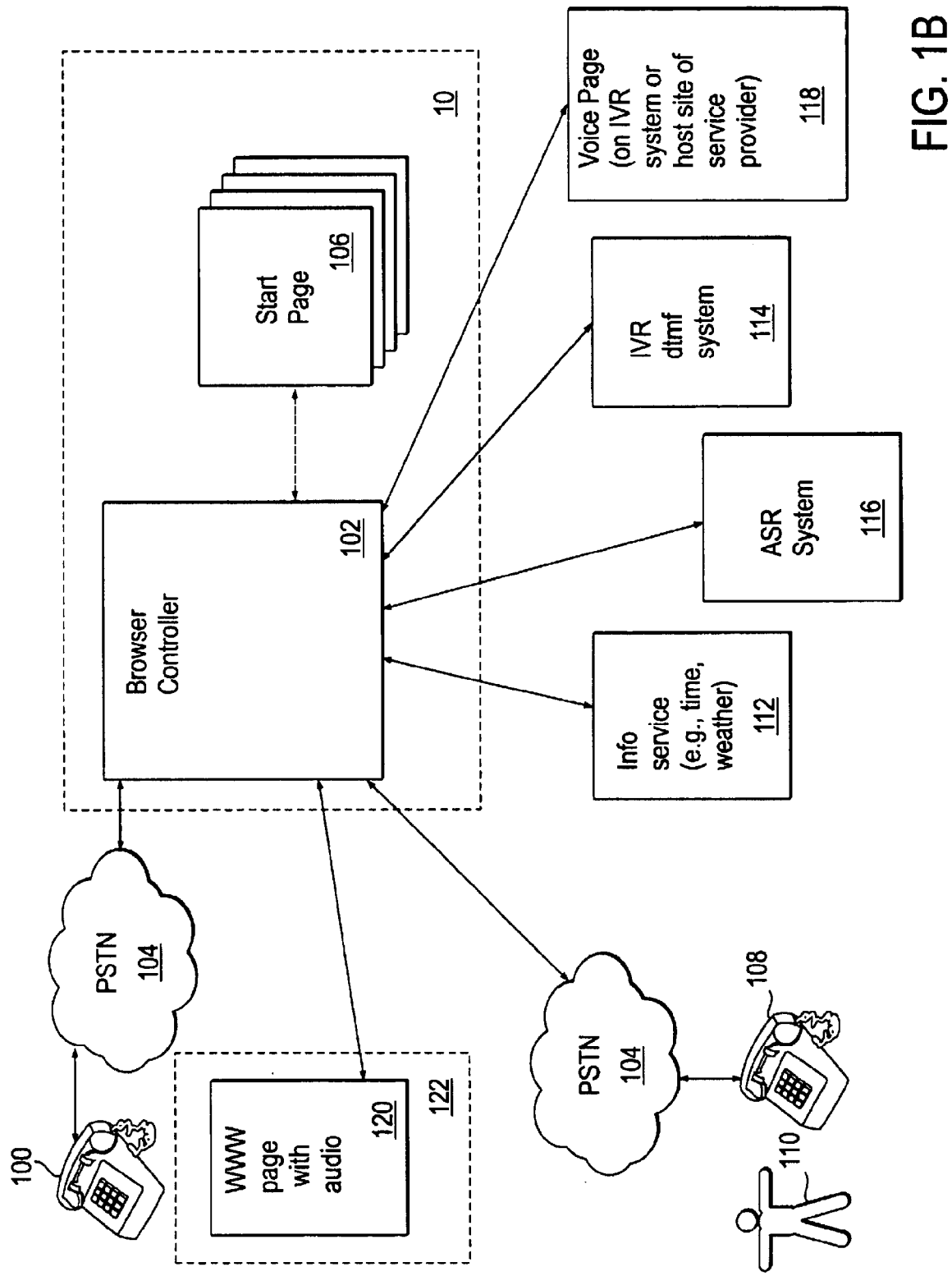
FIG. 1B is a block diagram showing the voice browser connected to number of remote sites on a network.

Refer now to FIG. 1B, which shows an example of a network that incorporates the capabilities described above (and further described below). A user can access the browser 10 using any conventional telephone 100 system including a stand-alone analog telephone, a digital telephone, a node on a PBX, or the like. The browser controller 10 may be accessed by the user using a conventional telephone 100. It is anticipated that the browser controller 10 will be provided as a service to many users requiring similar access thereto. Hence, a voice service provider may provide the computer resources, telephony equipment, and Internet connectivity to host a "farm" of voice browsers like browser 10. Corporations may also use this invention to provide voice access to their websites for their customers, also potentially providing a linking ability to those sites to which they choose to allow such linking. Thus, users may typically access the browser controller 10 via the PSTN 104. However, in certain corporate or institutional environments, a browser 10 may be made available to the users at the institution, such as in a PBX, thereby eliminating the need to connect the user's conventional telephone 100 to the browser controller 10 via the PSTN 104 and instead allowing a direct connection. Additionally, the browser controller 10 could be implemented in hardware and/or software in a personal computer (PC) or the like; that approach avoids the need to connect the user's conventional telephone 100 to the browser controller 10 via the PSTN 104, instead allowing a direct connection via the Internet.

In the browser 10, the browser controller 102 may include a pointer to a start page 106, as shown, for each user of the system. The start page 106 can operate in conjunction with the browser controller 102 as a personal home page for the user. The start page could also be any voice page on the voice web. The browser controller 102 possesses a grammar to assist the user with navigation and other browser functions. In addition, the browser controller 102 generates a dynamic grammar of the browsable links on each voice page that is visited. The browser controller 102 also includes a number of dynamic grammars which are modified according to the needs of each particular user. These grammars will be described in more detail below.

Using the system described herein, a user may access a personal start page by dialing a telephone number assigned to the browser 10, connecting the user to the browser controller 102. The browser controller 102 can connect sequentially to each desired voice page. The browser controller 102 preferably maintains its connection to the user, makes connections to the desired voice page, and enables the caller to interact with the voice page. This allows the browser controller 102 to monitor the calls between the user and each voice page. If a current voice page contains an audiolink to another voice page which is selected by the user, the browser controller 102 makes a connection to the selected voice page, and then if this connection is successful, severs the call to the current voice page, all the while maintaining its connection to the user. The voice activated browser 10 thus allows the user to scout information or services available on a collection of available voice pages. The user is capable of directing the browser controller 102 via the user's voice, freeing the user's hands for other tasks such as driving or writing. Further, the browser controller 102 relays information to the user via an audio source. The browser controller 102 is also configured to contact any of the voice pages.

An originating user can place a telephone call using a conventional telephone 100 directly to a second conventional telephone 108 of another user 110 via the PSTN 104 in the conventional way. Alternatively, the user may place a telephone call using a conventional telephone 100 to the browser controller 102. Once the link is established to the browser controller 102, the originating user is recognized and instructs the browser controller 102 to place the call to the conventional telephone 108 via the PSTN 104. The originating user can be recognized using any known method. The browser controller 102 dials the telephone number of the second conventional telephone 108 to establish the link. The originating user is linked to the receiving user through the browser controller 102. In this way, the browser controller 102 has two links via the PSTN 104, one to the originating user and one to the receiving user.

This process of linking through the browser controller 102 provides advantages over a conventional telephone call. As noted, the browser 10 includes a natural language speech recognition engine 94 (see FIG. 1A) configured to 'listen' to the originating user. Each originating user speaks a known assigned browser wake-up word or phrase (herein after simply "wake-up word") to provide commands to the browser controller 102. The browser wake-up word is preferably not a commonly used word. Under certain circumstances a user may select his own browser wake-up word. When the browser controller 102 recognizes the browser wake-up word spoken by the originating user, the browser controller 102 reverts to a command mode, to be discussed in more detail below. The browser controller 102 can be configured to simply wait for a command after the browser wake-up word, or the browser controller 102 can respond by generating an appropriate prompt utterance, such as, "How can I help you?". Depending upon the nature of the command, the link to the receiving user can be either maintained or severed. Other calls can then be placed, as described below.

The originating user can establish other types of communications links using the browser controller 102. For example, the originating user might desire to receive audio information such as the time or a weather report. Other types of audio information are also available. Accordingly, the originating user can dial the information service directly using the telephone number for that service. Alternatively, the originating user can dial the browser controller 102 and instruct it to call a predetermined information service 112. Once the call is established to the information service 112 by the browser controller 102, the originating user hears the desired information in the usual way. At any time, the originating user recites the browser wakeup word and can sever the call to the information service 112 and have the browser controller 102 place another call.

The originating user can use the browser controller 102 to call an IVR system 114 which recognizes only dual-tone multifrequency (DTMF) tones instead of speech as input (but which generates speech in response to the DTMF inputs). Once the browser controller 102 connects the originating user to the IVR system 114, the user can extract or provide information as necessary using the key pad on the conventional telephone 100. Upon concluding the desired transaction or communication, or whenever the user appropriately signals the browser (such as by speaking the wake-up word or by performing a telephone "hook flash"), control is returned to the browser controller 102. Thereafter, the connection to the IVR system 114 can be severed or reasserted.

Similarly, the originating user can use the browser controller 102 to call an ASR system 116 which includes a natural language speech recognition system. Once the browser controller 102 connects the originating user to the ASR speech system 116, the user can extract or provide information as necessary using a natural language dialog. Upon concluding the desired transaction or communication or at any time the user speaks the browser wake-up word, the originating user states the browser wake-up word and control is returned to the browser controller 102. Thereafter, the connection to the ASR system 116 can be severed or reasserted. For example, the user may speak the browser wake-up word to return control to the browser controller 102, but still desire to return to the present telephone link. Once the control is returned to the browser controller 102, any appropriate action can be taken. For example, the user could request that a bookmark be made for the present page. Then, upon uttering the appropriate command, the browser controller 102 returns the user to the pending link. All of the links described above may be accessed via the PSTN using a conventional telephone number to initiate contact.

As another example, the originating user can use the browser controller 102 to call an audio- and/or speech-enabled Web page 120 on a Web server 122. The configuration of such a speech-enabled Web page 120 will vary according to the needs or desires of the developer. For example, the developer could include the ability to determine whether contact originated via the Web or from the PSTN and audio web. The developer can configure the page to include voice content in much the same way as a voice page 118. Any hyperlink that exists on the Web page could be identified by an audio indication in the manner described herein. This hyperlinking could also take place in a Web page that has not been speech-enabled. The browser controller 102 may include a text-to-speech converter so as to read the contents of the page to the originating user, who has made contact with the browser controller 102 via the PSTN 104. The same audio indications can be used to indicate the hyperlinks on the Web page. Unlike the other links described above, a conventional Web page is not accessed using a telephone number over the PSTN 104. Rather, a Web page is accessed using an Internet address. Further, with the Internet, Web information is generally transferred directly using a conventional protocol such as Hypertext Transport Protocol (HTTP). Communications via the Internet are generally not carried out using data signals exchanged between pairs of modems over the PSTN 104. This is true in spite of the fact that many users access the Internet via an Internet service provider (ISP). The communications between the user and the ISP are carried out using data signals exchanged between a pair of modems; however, the communications for the same information transaction from the ISP to a site on the Internet is carried out using an Internet protocol, such as Transport Control Protocol/ Internet Protocol (TCP/IP) and/or HTTP.

For at least this reason, without a direct Internet connection, the browser controller 102 described above does not interact directly with a conventional page on the Web. Consequently, the browser controller 102 may include a secondary dedicated Internet connection to interface the browser controller 102 to the Internet. The browser controller 102 is configured to bi-directionally communicate data between the browser controller 102 and the Internet. Additionally, the browser controller 102 is also configured as a gateway to bi-directionally couple audio voice information between the user through the PSTN 104 on the one hand, and the Web page via the Internet on the other hand. As an alternative, each server that serves Web pages that include voice information configured to interact with a browser controller 102 could be configured to have access by telephone and a modem and further include its own gateway. However, such a construction would likely require considerable duplication of equipment and software across all of the appropriate Web servers and pages.

Another alternative would entail providing PSTN access to the Web. This approach may help to overcome the well known latency problems with the Internet. As Internet latency issues are resolved, this approach may become less desirable.

As another approach to providing access from the browser controller 102 to a Web page or ASR system (for example), one can include an interface using the so-called "IP telephony" protocols. As is well known, IP telephony allows simultaneous transmission of both voice and digital data. Alternatively, a parallel telephone line and Internet connection can be provided to emulate IP telephony. Yet another alternative allows the use of extensible Markup Language (XML) or another similar voice/data protocol, such as Voice XML (VoxML or VXML) or HTML extensions, to provide Internet access to a PSTN application such as the browser controller 102.

As clear from the discussion above, many if not all of the features described herein can be utilized even when accessing conventional telephony services. Such functionality provides the originating user access to the more than 800 million currently-existing telephone numbers by using the features of the browser 10. The: full power of the browser 10 can be achieved by connecting to a voice page 118 specifically designed to accommodate all the advantages of this invention, including hyperlinking as defined herein.

The voice page 118 can be formed on an ASR system or as a Web page, for; example. As information is presented to the originating user, certain voice-accessible items are specially identified to the user. For example, a particular audio information segment may be configured to inform the user of the latest stock prices by stating, "The current trading price of <Apple> is $xx.xx dollars per share. The current trading price of <IBM> is $yy.yy dollars per share." The less-than character ("<") represents an audible beginning marker, such as an earcon (defined below), to inform the user that a custom audiolink is beginning. Similarly, greater-than character (">") represents an audible ending marker to inform the user that a custom audiolink is ending. Following the above utterance, if the user wanted to learn more about the company Apple Computer, then the user could say, "Apple". If limited to the above audio information segment and the user wanted to know more about "trading price", by saying, "trading price," the user would not receive details on "trading price" because there is no audiolink to "trading price." The user would know that "Apple" is a valid audiolink, because the user can hear the beginning marker ("<") before the word "Apple" is read and can hear the ending marker (">") after the word "Apple". For example, the beginning marker ("<") might be represented as a sequence of three rising audible notes arranged such that the pitch for each note rises in the sequence. Additionally, the ending marker (">") can be represented as a sequence of three failing audible notes arranged such that the pitch for each note falls in the sequence. The term "earcon" is used for this process of audibly marking a custom grammar audiolink. The previous example is merely for illustrative purposes; many other implementations are possible. For example, the text of an audio link could be spoken in a different voice, a background sound could be mixed with the audio link, or the text of the audio link could be surrounded by pauses. It will be apparent to those skilled in the art that there is no meaningful way to limit the number of ways to audibly mark a custom grammar audiolink.

When the browser controller 102 hears the originating user repeat an audiolink, a new telephone number is dialed or a Web page is accessed in accordance with the repeated audiolink. If successful, the connection with the currently accessed voice page 118 is severed. The browser controller 102 knows the telephone number or the Web URL corresponding to the repeated audiolink, because that information was transmitted by the voice page 118 to the browser controller 102. There is sufficient bandwidth even on the PSTN 104 to allow such information to be transmitted between such equipment, transparently to the originating user, and without any loss of ordinary speech functionality or quality.

Another type of connection can be established to a Web page which includes audio capability, or plain text that can be read via a text-to-speech converter. Such a page is configured to provide either graphical data, voice data, or both, depending upon the type of equipment that accesses it. In this way, links can be displayed graphically as hypertext links in the usual way or as voice links with an earcon, or other audio indication, or both. Certain links will only be available to a computer user logged onto the Internet and only provide graphical information. Such links will not be presented with an earcon to the originating user. Other links will only be to voice services and will only provide audio information. Such links will not be presented with a hypertext link on the graphical Web page. Still other links will be to a data provider that offers both graphical and audio data and both an audio indication and a hypertext link will be available.

The link to the Web page can be made by the browser controller 102 through a modem via the PSTN 104 or via a gateway as is well known, though a gateway may be preferable. In either case, such connections are utilized to provide the advantages described herein.

The originating user can perform a number of functions by using the browser controller 102. All originating users may have a predetermined suite of functions and commands available to them upon connection to their respective browser controller 102. One example of such a set of functions is provided in Table 1.

TABLE 1

Grammars Residing on Browser/Controller

| Static | Dynamic |
|---|---|
| next page | bookmark 1 |
| previous page | bookmark 2 |
| go back | . |
| go home | . |
| go to my start page | bookmark n |
| what are my choices | telephone number 1 |
| help | telephone number 2 |
| where am I | . |
| add this to my bookmarks | . |
| delete this from my bookmarks | telephone number n |
| go to my bookmarks | preference 1 |
| go to bookmark _____ | preference 2 |
| search | . |
| personal information | . |
|  | preference n |

Further, each originating user may develop a series of individual tasks for their browser controller 102 to perform, which may be stored on their personal start page. Such dynamic information allows the originating user to make calls or connect to known services without having to remember telephone numbers. Consider the following example of how such information may be used. While driving to work, an originating user accesses his browser controller 102 and states the command, "weather". The browser controller 102 then dials the number it knows for the local weather report and allows the user to listen to the report. The browser controller 102 maintains the connection until it 'hears' the browser wake-up word. Upon hearing the browser wake-up word, the browser controller 102 waits for a command. The originating user then asks for his stock list. The connection to the weather report is severed, and a new connection is established to the service that provides stock information. That connection is maintained until the browser controller 102 again hears the browser wake-up word. The originating user then commands, "call Mom", whereupon the browser controller 102 severs the connection to the stock list and dials the specified person. The originating user concludes the call and then accesses a voice page 118 news report. During an advertisement, an audio indication announces a link to a local restaurant using an earcon. The originating user then says the name of the restaurant. The browser controller 102 automatically connects the originating user to the restaurant, then disconnects the present call. The originating user then makes a lunch reservation. All of these communication transactions occur without the originating user having to dial any number except the first call to the browser controller 102. Further, the user accessed conventional telephones, ASR systems, IVR systems, audio information services, and voice pages in a single call to the browser controller 102.

A set of static and dynamic grammars will be active on each voice page 118. Depending on the implementation, voice recognition for the items in these grammars could reside as part of either the browser controller 102 or the voice page 118. Table 2 provides one example of such grammars. Of course, a greater or lesser number of items may be included in these grammars.

TABLE 2

Grammars Active on Voice Pages

| Static | Dynamic |
|---|---|
| help | dynamic links |
| what are my choices |  |
| static links |  |

The voice page may include dynamic grammars, because certain items may change periodically. For example, news represented on a news voice page may change continually. The news reports will contain audio links to other voice pages, telephone numbers, or audio information services and the like which correspond to the news report. Thus, these links will necessarily be dynamic. Either the voice page 118 or the browser controller 102 will generate the dynamic grammar links. For example, if the voice page 118 is a Web page, then the dynamic grammar will be generated by the test of the links that are denoted by the audio cues such as earcons.

As noted above, the browser 10 may be implemented, at least in part, as software that is executed on a computer system or on multiple networked computer system s. Other processing systems in the network of FIG. 1B, including any or all of the IVR system 114, the ASR system 116, and the voice page 118, and the Web server 122, may also be implemented in one or more computer systems. FIG. 1C is a block diagram showing the hardware components of a computer system that is representative of any of the above-mentioned processing systems. Note that FIG. 2 is a high-level conceptual representation and does not imply that there is any limitation to any particular hardware configuration—there is no such limitation.

As shown, the computer system includes a central processing unit (CPU) 20, read-only memory (ROM) 21, and random access memory (RAM) 22, each connected to a bus system 29. The bus system 29 may include one/or more physical buses connected to each other through various bridges, controllers and/or adapters, such as are well-known in the art. For example, the bus system 29 may include a "system bus" that is connected through an adapter to one or more expansion buses, such as a Peripheral Component Interconnect (PCI) bus or the like. Also coupled to the bus system 29 are a mass storage device 23 and various input devices 24, 25, various output devices 26, 27, and a communication device 28. The input devices 24, 25 may include, for example, one or more of: a keyboard, a pointing device, a touch-sensitive screen, a speech recognition subsystem, etc. The output devices may include, for example, a display device and audio speakers. Mass storage device 23 may include any suitable device or devices for storing large volumes of data in a non-volatile manner, such as a magnetic disk or tape, magneto-optical (MO) storage device, or any of various types of Digital Versatile Disk (DVD) or compact disk (CD-x) storage. The communication device 28 may be any device suitable for enabling the computer system 1 to communicate data with another, remote processing system over a data link, such as a conventional telephone modem, a cable modem, an Integrated Services Digital Network (ISDN) adapter, a Digital Subscriber Line (xDSL) adapter, a network interface card (NIC), a Ethernet adapter, or the like. Again, FIG. 1C is only in example. Hence, for particular processing systems, components may be added to and/or omitted from the illustrated system.

Figure 2:
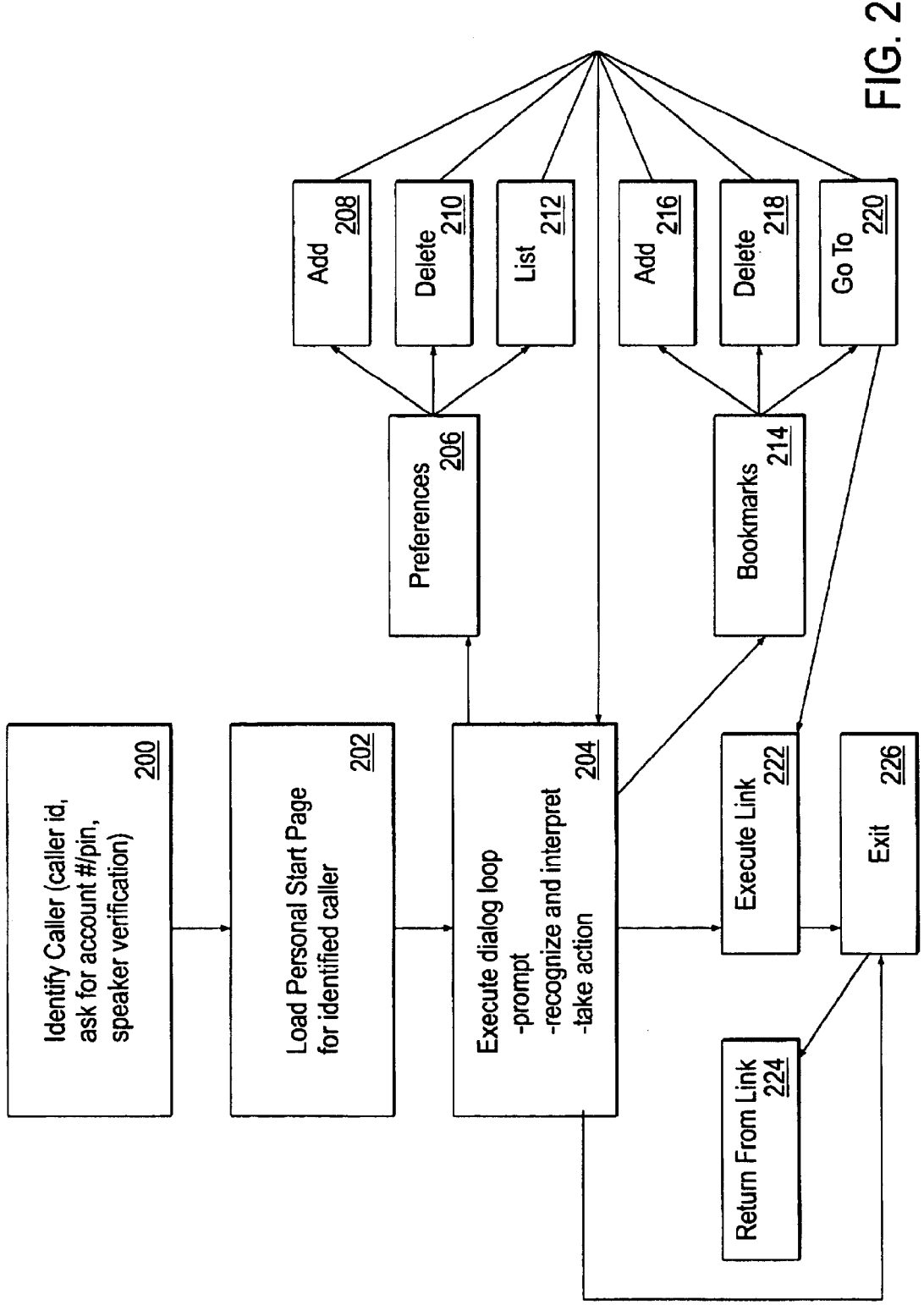
FIG. 2 is a flow chart illustrating the overall operation of the browser controller.

FIG. 2 is a flow chart showing the overall operation of the browser controller 102 (FIGS. 1A and 1B), according to at least one embodiment. The originating user calls the browser controller 102 which identifies the caller using any known method in block 200. Once the originating user is identified, the browser controller 102 (optionally) loads the start page 106 (FIG. 1B) for that originating user in block 202. The browser controller 102 executes a dialog with the originating user in order to receive a command. For example, the prompt "Hello, Steve. How may I help you?" might be output. Depending upon this interaction, including commands replied by the originating user, an activity will be performed. For example, if the originating user says "Preferences" 206, the browser controller 102 initiates a program related to their preferences. The originating user can then command "Add" 208, "Delete" 210 or "List" 212, to execute those functions. Upon concluding this activity, the browser controller 102 returns to the Execute Dialog block 204, and a new dialog exchange occurs between the originating user and the browser controller 102.

As another example, the user might command "bookmarks" 214. The originating user can then command "Add" 216, "Delete" 218' or "Go to" 220 to execute those functions. Upon concluding this activity, the browser controller 102 returns to the Execute Dialog block 204 and a new dialog exchange occurs between the originating user and the browser controller 102. Alternatively, the originating user could provide a "Go to" command or request an audio link which requires making a new telephone call. The browser controller 102 then enters the Execute Link block 222. This operation couples the originating user to another telephone number or Web page via the browser controller 102. Upon completion of the link, the browser controller 102 will return to the Execute Dialog block 204 via the Return From Link block 224.

From the execute dialog block 204 the originating user can instruct the browser controller 102 to replay the originating user's start page. If no audio link is recited, the control is returned to the Execute Dialog block 204. If an audio link is recited, the Execute Link block 222 makes the appropriate connection. As mentioned before, the audio link could be set apart from the rest of the voice page by earcons; however, there are also other means for distinguishing an audio link.

The originating user can instruct the browser controller 102 in the Execute Dialog block to perform a search of voice pages 118. The search request can be performed by an appropriate search engine. Finally, the interaction can be concluded and the call placed on hook (terminated) in the Exit block 226.

Figure 3:
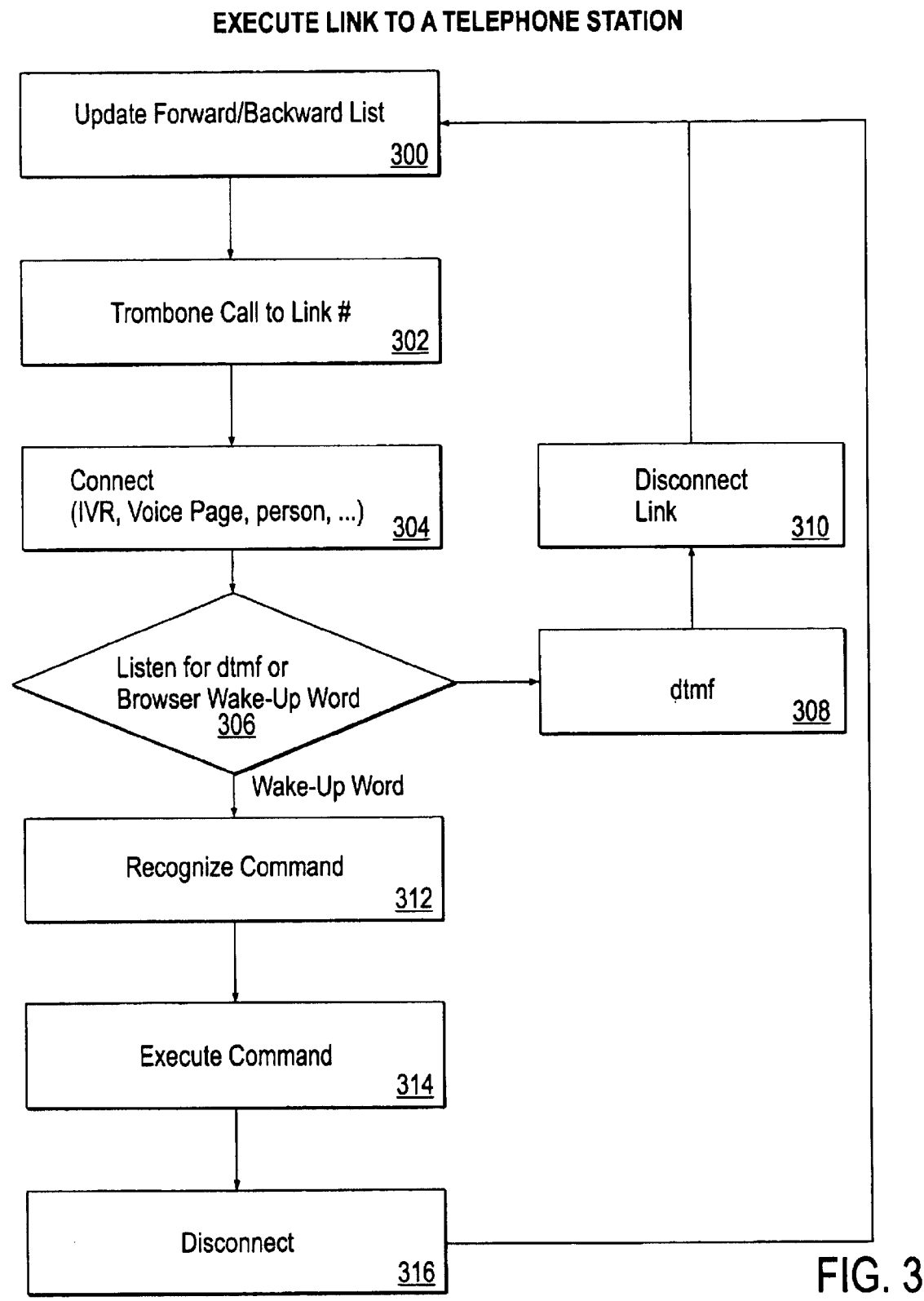
FIG. 3 is a flow chart illustrating the Execute Link operation.

FIG. 3 is a flow chart showing the operation of the Execute Link block 222 (FIG. 2). A list is maintained of the calls placed during the session, which allows the originating user to return to a previous call. Once the Execute Link block 222 is entered, the forward/backward list is updated in the block 300 with the link information communicated with the command to Execute Link. The call is made to the link telephone number in the block 302. The call is connected to the desired telephone number in the block 304. Thereafter, while the call is in progress, the browser controller 102 listens for either DTMF tones or the browser wake-up word in block 306. If a DTMF command is executed in block 308, the link is disconnected in the block 310, the forward/backward list is updated in block 300, and a new call is made as before in block 302. As an alternative to DTMF, as mentioned before, the browser controller's 102 telephone station and the voice page's telephone station could communicate via IP telephony or could include a parallel Internet connection to emulate IP telephony. In this case, rather than using DTMF, the destination telephone number or Web URL could be communicated over this data channel. Furthermore, additional information such as the state of the user's interaction may be communicated. If the browser wake-up word is heard in the block 306, the Recognize Command block 312 identifies the command which is executed in the Execute Command block 314. If the command is not for a new link, control returns to block 306 to continuing listening for DTMF tones or the browser wake-up word. If the command is for a new link, the current link is disconnected in block 316, the link is disconnected in block 310, the forward/backward list is updated in block 300, and a new call is made as before in block 302. Or, instead of making a call, a Web page could be downloaded off of the Internet.

Figure 4:
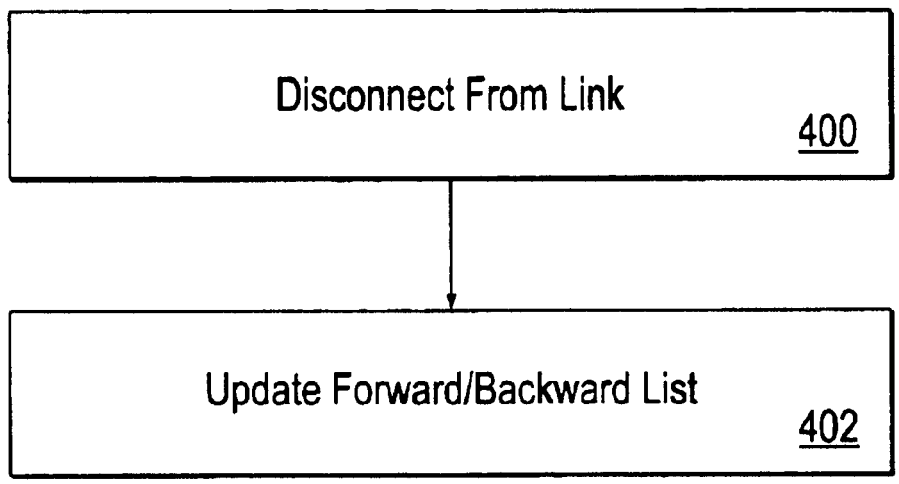
FIG. 4 is a flow chart illustrating the Return From Link operation.

FIG. 4 is a flow chart showing the operation of the Return From Link block 224 (FIG. 2). First, the telephone call is disconnected in block 400. Then, the forward/backward list is updated in block 402.

Figure 5:
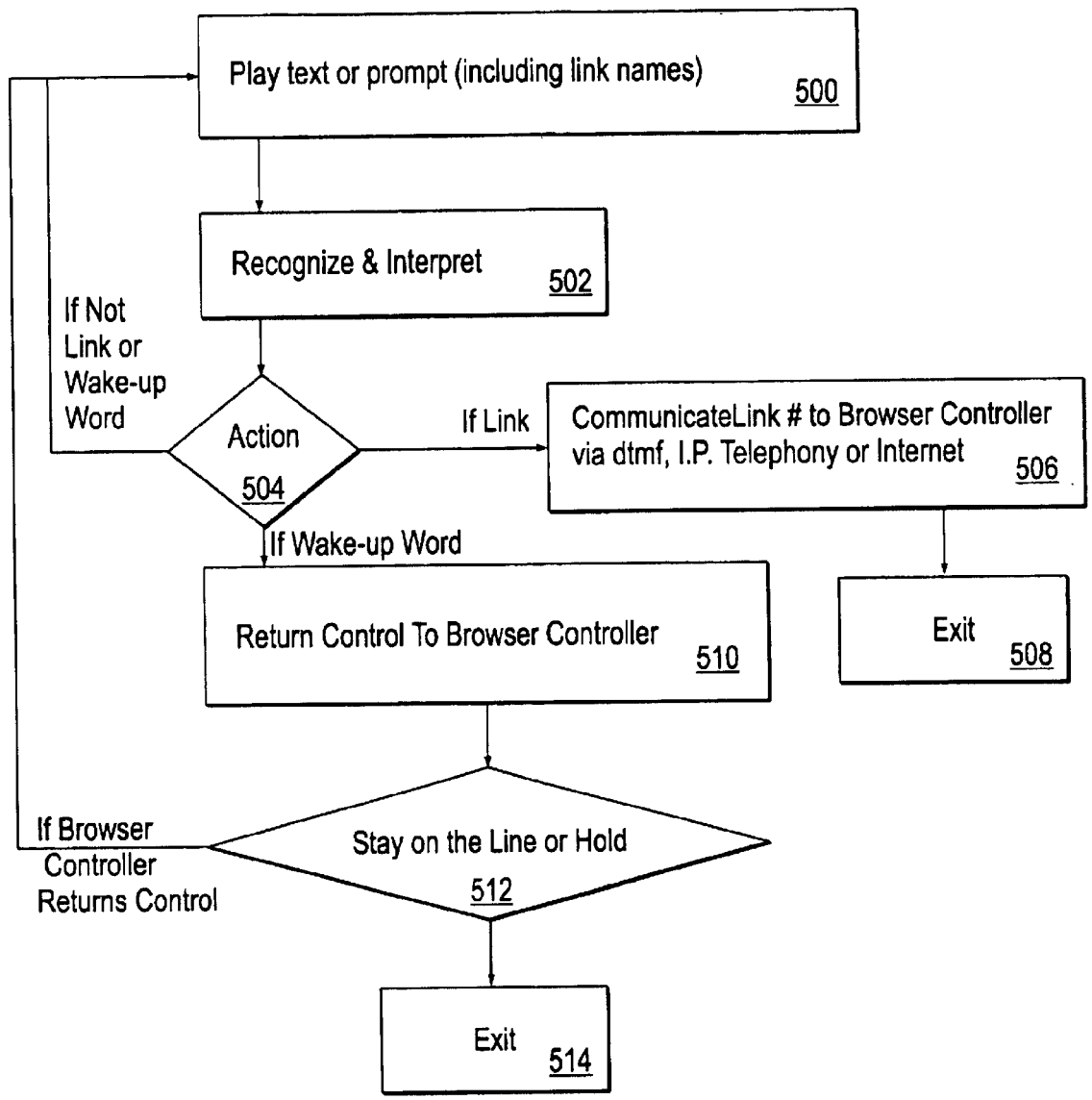
FIG. 5 is a flow chart illustrating the functionality of a voice page.

FIG. 5 is a flow chart showing the operation of the voice page 118 (FIG. 1). Upon being accessed, the voice page 118 plays audio text or prompts in block 500. The prompts can include a link name or a list of link names. The speech of the originating user is recognized in block 502. Upon recognizing a command, an action is undertaken in block 504. If the action was stating the name of a hyperlink, the telephone number for that link is DTMF transferred to the browser controller 102 (FIGS. 1A, 1B) in block 506. Alternatively, the link could be communicated to the browser controller 102 via IP telephony or an Internet connection, as shown in block 506. Thereafter, the voice page 118 is exited in block 508 to return control to the browser controller 102. If the action was not a link or the browser wake-up word, then the voice page 118 returns to the play text block 500. If the action was the browser wake-up word, control is returned to the browser controller 102 in block 510. The line is maintained in an on-hold condition in the block 512. If the browser controller 102 returns control to the voice page 118, the operation returns to block 500. If the browser controller 102 terminates the link, then the voice page 118 exits in block 514.

Figure 6:
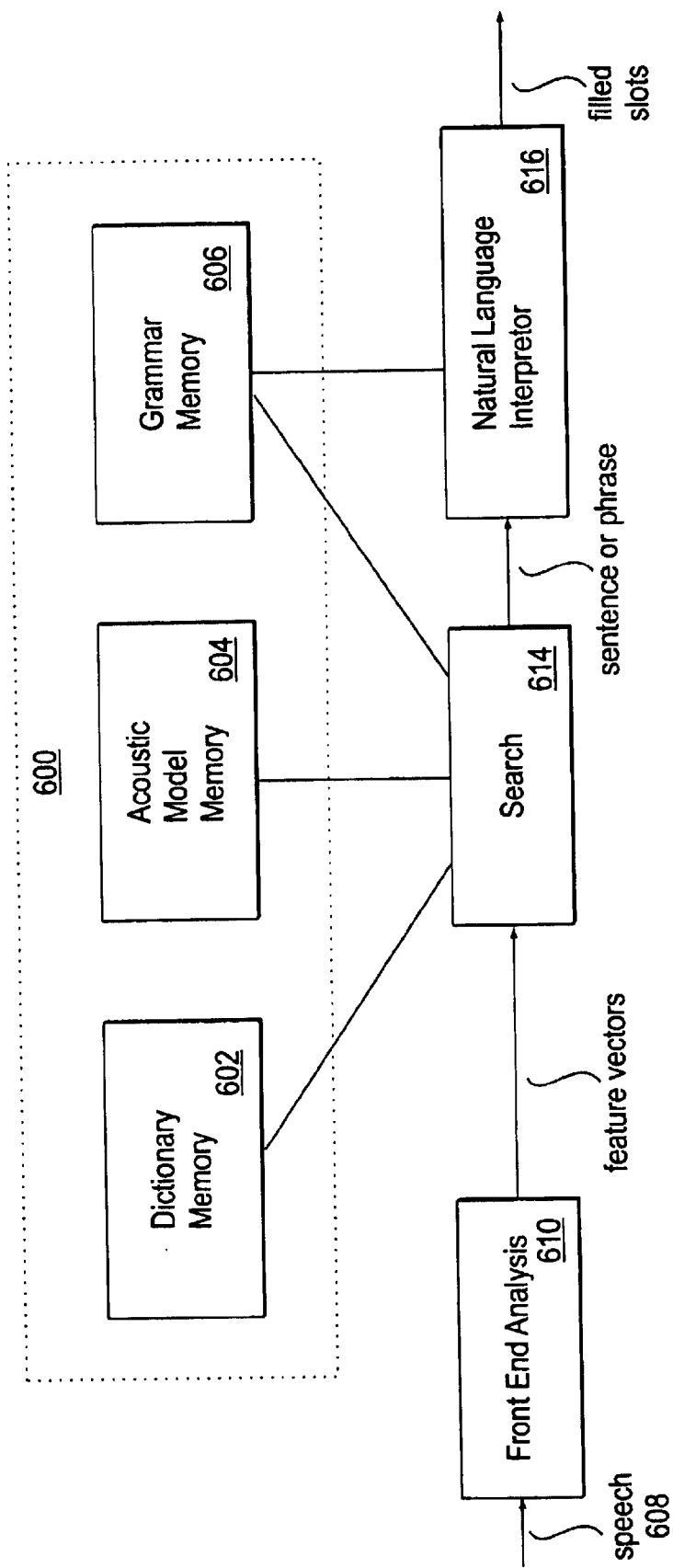
FIG. 6 is any block diagram of a speech recognition and interpretation system.

FIG. 6 is a flow chart showing the operation of the recognize and interpret functions associated with the browser 10 and the voice page 118 (FIG. 1B). In at least one embodiment, these functions are implemented in the speech recognition engine 94 of the browser 10 (FIG. 1A). A memory 600 includes a dictionary memory 602, an acoustic model memory 604 and a grammar, and their pronunciations memory 606. The dictionary memory 602 contains all of the words in the grammar. The acoustic model memory 604 contains all the statistical models of all phonetic units that make up the words. An input signal 608 containing digitized speech is input to a front end analysis module 610. The front end analysis module 610 includes a voice activity detector and separates feature vectors from the digitized speech, each covering a predetermined length of speech. In at least one embodiment, a feature vector is output for each 10 msec in length of the speech signal. The feature vectors are provided to the search engine 612, which compares the feature vectors to the language model. The search engine 612 uses the grammar memory, which defines all of the word strings that the originating user might say. The dictionary memory defines how those words might be said and the acoustic memory stores the phonetic segments for the dictionary of words. A best guess is made for the words. This string of words is provided to the natural language interpreter 616, which assigns a meaning to those words.

It is possible for the functions described above to be implemented and utilized by users that do not have their own browser or access an account on a service provider's browser. For example, consider an airline, car rental agency, and hotel chain that agree to market cooperatively. A user could call the airline to make travel arrangements to a city. The flight arrangements can be made and tickets can be purchased using an automated system. The automated system can include a browser such as described above. In such a case, the user could be prompted by appropriate earcons or other audio cues to then reserve a rental automobile with the cooperating car rental agency. The browser in the airline's automated system can then automatically connect the user to the car rental agency in the manner described above. Once the automobile is rented, the car rental agency's browser can then connect the user to the hotel to reserve a room.

As will be readily understood, the user in this example is daisy-chained to the hotel through both the airline's browser and the car rental agency's browser. When a user is daisy-chained, each call in the chain remains active and therefore may be billed by the telephone service provider. Thus, it may be preferable that the browser operate as described above, wherein in it establishes a new call upon hearing the user repeat an audio link and then disconnects the previous call rather than daisy-chaining the calls through one another.

As another example of how the above-described capabilities can be utilized by users that do not have their own browser, consider a case in which the airline does not wish to link to the hotel and the rental car voice pages. Even so, it is still to the airline's advantage to use the features provided by the above-described browser 10. The browser 10 can read the airline's information as a speech-enabled Web page, thereby eliminating the need on the part of the airline for a separate ASR system with separate database integration. If a user has his own browser, then the airline does not need to provide telephone access to its Web page. However, if the user does not have their own browser, the airline can provide it for them. The airline could also lease time on a browser that exists at an external call center, eliminating the need for the airline to have its own call center for telephone access to its Web page. This approach provides for considerable economies of scale. With intelligent caching of the airline's voice data, prompts and grammars, latency can still be kept to a minimum.

It will be apparent to those skilled in the art that modifications can be made in the embodiments chosen for illustration without departing from the spirit and scope of the invention. For example, the Browser Controller 102 could be configured to first disconnect an existing link before establishing a new link.

II. Dialog Optimization

As noted above, another aspect of the browser 10 (FIGS. 1A, 1B) is that it maintains and/or brokers information associated with users, as well as other information, on behalf of other sites on the network. This functionality may be used to make users' interactions with speech-enabled sites shorter and more pleasant. Accordingly, when a user uses the browser 10 to access a given speech-enabled site (e.g., ASR system 116, voice page 118, or speech-enabled Web page 120, or even a site operated by human operator), the browser 10 may provide the accessed site with information about the user (or other information) which it maintains or to which it has access. The information can be provided in a manner which is transparent to the user. However, the user may be required to give explicit permission for certain information to be transferred. The information may have been acquired from the user through one or more previous spoken dialogs between the user and speech-enabled sites on the network, through a graphical user interface (GUI) provided by a site on the network, or through any of various other methods. The information may be used by the accessed site to optimize a spoken dialog between the accessed site and the user or to otherwise facilitate its interaction with the user. For example, the information provided by the browser may be information which the user would otherwise be required to speak during the dialog. This functionality, therefore, can be used to shorten the length of the dialog and reduce the audio cues necessary for conducting a transaction or presenting information. As noted above, such optimization is crucial in the inherently bandwidth-limited audio environment, in which information is generally communicated sequentially. Note that this capability may also be used to optimize a dialog between a user and a human operator; for example, information about the user may be provided to a computer system used by the operator from a remote site on the network, to assist the operator in shortening a dialog between the operator and the user.

As an example of how this information sharing capability may be applied, consider the following. A user invokes the browser 10 in order to access an airline's speech-enabled site to make an airline reservation. Subsequently, the user accesses the speech-enabled site of a rental car agency to make a rental car reservation. Accordingly, information about the user's flight arrival time and destination city, which was acquired during the user's interaction with the airline's site, may be provided to the rental car site to expedite the user's interaction with the rental car site. Thus, information about a user can be effectively shared between separate speech-enabled sites on the network, in a manner which is transparent to the user, in order to expedite the user's interaction with those sites. Alternatively (or additionally), information about the user which is used to optimize a dialog may be maintained by the browser 10, such as in a user profile. For example, the browser 10 might include a profile for a given user that includes the closest airport to the user's home; this information may then be provided to the airline's site for use as the departure airport, avoiding the user's having to provide that information to the airline's site.

This information sharing functionality is provided, at least in part, using the lookup service 98 of the browser controller 102 (FIG. 1A). In at least one embodiment, the lookup service 98 is implemented as a Jini lookup service, as is henceforth assumed in this description. Accordingly, the browser controller 102 includes an appropriate application program interface (API) to implement this functionality. Note, however, this functionality may alternatively be implemented using techniques other than Jini. For example, this functionality may also be implemented using techniques such as Lightweight Directory Access Protocol (LDAP), Object-Oriented Relational Database Management Systems (OORDMS), and Java Spaces.

As is well-known, a Jini based system is a distributed system based on the idea of federating groups of users and the resources required by those users on a computer network. As noted above, an important concept associated with Jini is the concept of a 'service'. A service may be, for example, a computation, storage, a communication channel, software filter, hardware device, or another user. As used by the browser 10 described herein, a service may also consist of software code, which may be instantiated as an 'object'. One possible example of a service is an Itinerary object created by an airline's site to maintain a record of a user's itinerary, such as in the above example. Communications between services may be accomplished using Java Remote Method Invocation (RMI).

In a Jini based system, services are found and resolved by a 'lookup service'. The lookup service acts as the central bootstrapping mechanism for the system and provides the primary point of contact between the system and its users. More specifically, the lookup service maps interfaces indicating the functionality provided by a service to sets of objects that implement the service. Hence, the lookup service essentially functions as a switchboard to connect a client looking for a service with that service. In the voice-activated browser 10, lookup service 98 (FIG. 1A) provides such functionality, to allow information to be shared between sites.

Accordingly, the browser 10 may function as broker of information and/or services on behalf of other sites on the network. In particular, the browser 10 may function as a data broker, a service broker, or a target broker, in cases in which data or services needed by one content site are maintained on another content site. In each case, the browser 10 further may operate as a persistent broker, as described in greater detail below. Hence, the browser 10 may maintain a list those permissions and/or other user profiles indicating which types of information about the user may be shared with which speech-enabled sites. The browser 10 may thereby selectively provide such information based on these permissions and/or user profiles. In addition to brokering information between two or more other sites, the browser 10 may also maintain such information locally (e.g., within a user profile), for use by one or more remote content sites; in that capacity, the browser 10 may be considered a profile broker.

In at least one embodiment, when a user requests access to a speech-enabled site (a 'content site') through the browser 10, the browser controller 102 will download code from the accessed site to the browser 10. This code may consist of, for example, code for executing a dialog interaction between the user and the accessed site. The code may be in the form of one or more objects, which include the necessary grammars and/or prompts for executing a dialog. Although the user perceives that he is interacting with the accessed speech-enabled site, the user is actually interacting with the browser controller 120 executing the dialog code from the accessed site; the browser controller 120 provides the results of the dialog to the accessed site. Note, however, that in other embodiments, the dialog may execute on the accessed site, rather than in the browser 10.

The executing dialog code from the accessed site may include a 'request' for any available information on the current user, or a request for specific information that it needs. In response to this request, the lookup service 98 of the browser controller '102 selectively provides such information to the executing code, based on whether the accessed site has permission to use such information (as specified by the above-mentioned permissions). In addition, a speech-enabled site may also register with the lookup service 98 the fact that it has available information and/or services that may be used by other speech-enabled sites.

Figure 7:
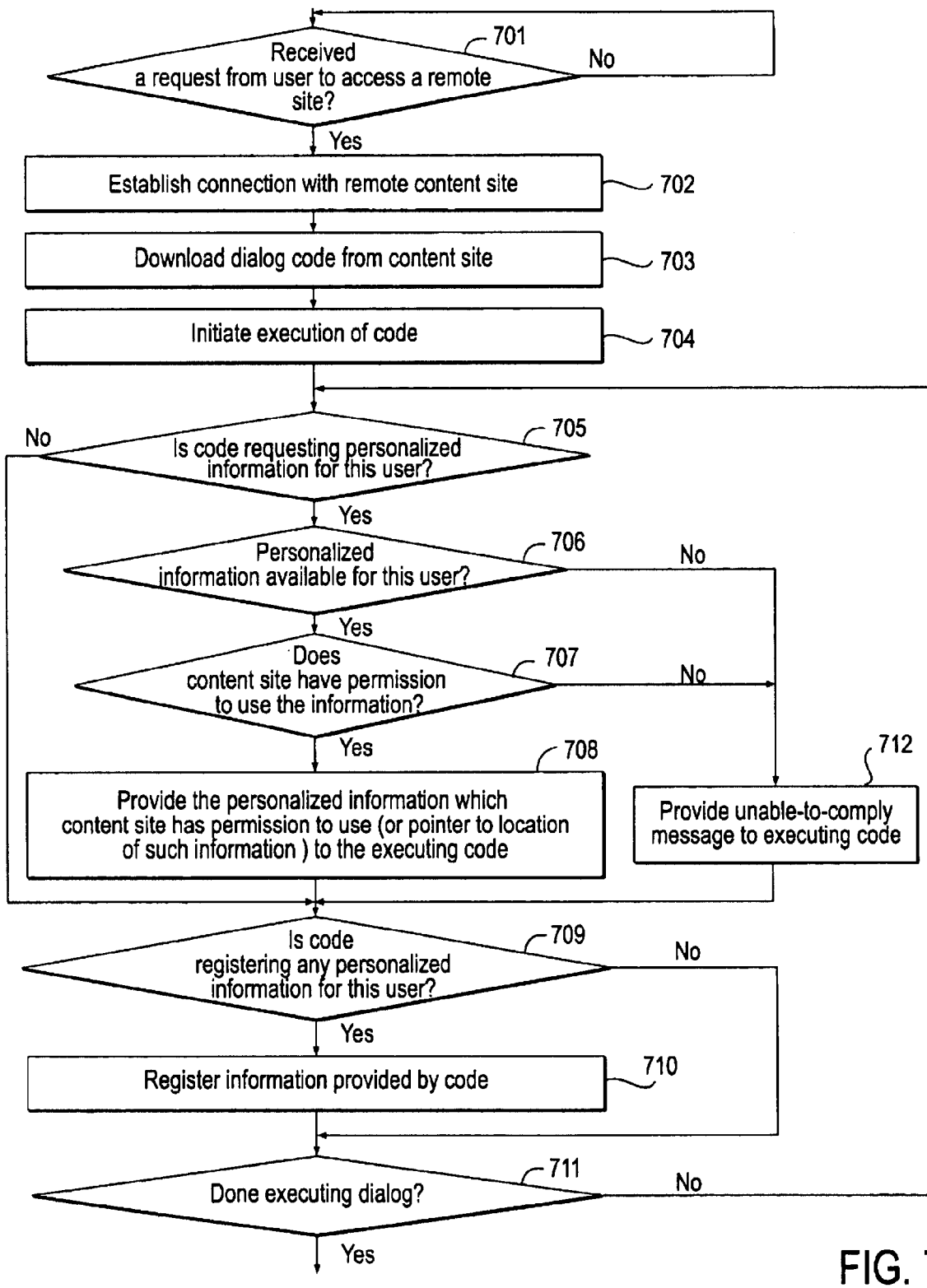
FIG. 7 is a flow chart illustrating an overall process for enabling information to be shared between speech-enabled sites on the network.

FIG. 7 illustrates an example of the operation of the browser controller 102 associated with the above-mentioned information sharing capability, for a least one embodiment. Note that this is just one example of how such capability may be implemented and used. Initially, at block 701, if the browser controller 102 has received a request from a user to access a remote content site, then at block 702 a connection with the remote site is established by the browser controller 12. Dialog code is then downloaded from the content site at block 703, and execution of the code is initiated at block 704. At block 705, it is determined whether the downloaded code is requesting personalized information for the current user. Such a request may be in the form of a call to the lookup service 98 (FIG. 1A). If the code is requesting such information, then is determined at block 706 whether such information is available for the current user. If such information is available, then a block 707 is determined whether the content site has permission to use such information. If the content site has permission, then at block 706 the requested information, or a pointer to the location of such information, is provided to the executing dialog code. If no information is available for this user (block 706) or the content site does not have permission to use such information (block 707), then the process proceeds to block 712, in which an unable-to-comply message is provided to the executing code. Following block 712, or if the downloaded code is not requesting any information for the current user, the process proceeds to block 709. At block 709, a determination is made whether the dialog code is requesting registration of any personalized information for this user which it has acquired (or any other information). Such a request may be in the form of a call to the lookup service 98. If such a request is being made, then information is registered at block 710. Following block 710, or if such registration is not being requested, it is determined at block 711 whether the dialog is complete; if not, the process repeats from block 705. Otherwise, the process exits.

As an example of how the above process can be applied, consider again the example of the airline and rental car content sites, and the commented dialog which follows. The following dialog shows the 'speech' generated by a user, the browser 10, and the speech-enabled content sites (or more precisely, the dialog code from the content sites that is executed by the browser 10). Also described are the functions performed in connection with each spoken exchange.

The user initiates a call to the browser 10. The browser 10 registers a UserInformation service (an object) for the user, which contains the user's name and other information. The browser 10 then provides an appropriate welcome prompt:

Browser: "How can I help you?"

User: "Flyaway Airlines."

The browser 10 downloads code from the Flyaway Airlines (FA) content site. The executing code requests the UserInformation service from the browser 10 and uses the included information to personalized its welcome prompt:

FA: "Welcome to Flyaway Airlines, Mike. How can I help you?"

User: "I'd like to purchase a ticket to Cleveland this Friday at noon."

The UserInformation service also identifies the user's home airport (here the browser 10 operates as a profile broker), so that the code from the FA content site does not have to query the user for that information:

FA: "I have a flight leaving at 1:00 p.m. for three hundred dollars. Would you like to buy a ticket for this flight?"

User: "Yes."

FA: "To do that I'll need your browser to verify your identity."

Browser: "Please say your home telephone number, including area code, now."

User: "1234567890"

Browser: <verification earcon>"Thanks. Your identity has been verified."

FA: "OK, Mike, your reservation has been made."

The code from the FA content site may use the verified identity of the user to correlate the user to an account in FA which has the user's credit card information, or it may receive the user's credit card information from the browser 10. The user is billed using FA's credit card processing service.

FA: "Drive-Right rental car agency is offering a special on car rentals. Would you like to rent a car while in Cleveland?"

User: "Yes."

FA: "I'll take you over to Drive-Right and let them know when you'll be arriving."

The FA code registers an Itinerary service (an object) for other travel services to use, to assist the user in making travel arrangements. The Itinerary service contains the user's flight information and may be protected by, for example, Java security. The browser 10 establishes a connection to the Drive-Right (DR) content site and downloads dialog code from that site. The DR code looks up the Itinerary service that FA registered to determine when the user will be in town, which airport the user will be arriving at, and how long the user will stay. The DR code also looks up the user's UserInformation service to determine the user's preferred rental car size, which in this example is compact. The DR code 'decides' to offer a midsize car at the compact rate to increase the user's likelihood of accepting the offer.

DR: "Welcome to Drive-Right. I noticed you'll be in Cleveland this weekend. I have a midsize car I can rent to you at the compact rate. Would you like to rent a car for this weekend?"

User: "Yes."

The DR code reserves a car of the selected size for the user.

DR: "A midsize car has been reserved for you this weekend."

The user hangs up the phone.

The above described data sharing capability can be used to provide security for purposes of accessing speech-enabled content sites. Such security can be used to control which content sites have access to user information, which information a particular content site has access to, or to control which content sites can be accessed by a given user. An example of a security-related application is centralized speaker verification. Techniques for performing speaker verification using voiceprint analysis (i.e., determining whether a speaker is who he purports to be) are known in the art. Certain voice service providers may provide capability to perform speaker verification within their content sites. Other providers, however, may not have the resources or may not wish to expend the resources to equip their content sites with such capability.

Accordingly, the browser 10 includes the capability to perform speaker verification services on behalf of content sites. For purposes of performing this function, the browser 10 may maintain voiceprints for various users. When a user accesses a content site that requires speaker verification, the content site may request that the browser 10 perform the verification to determine whether the user is who he purports to be. The browser 10 will then perform verification process and provide the content site with an indication of whether the speaker is verified. For example, the content site may ask the look-up service 98 for a service which performs user verification; the look-up service may respond by providing the content site with an object which performs the verification or which gives the content site a handle to such a service.

Figure 8:
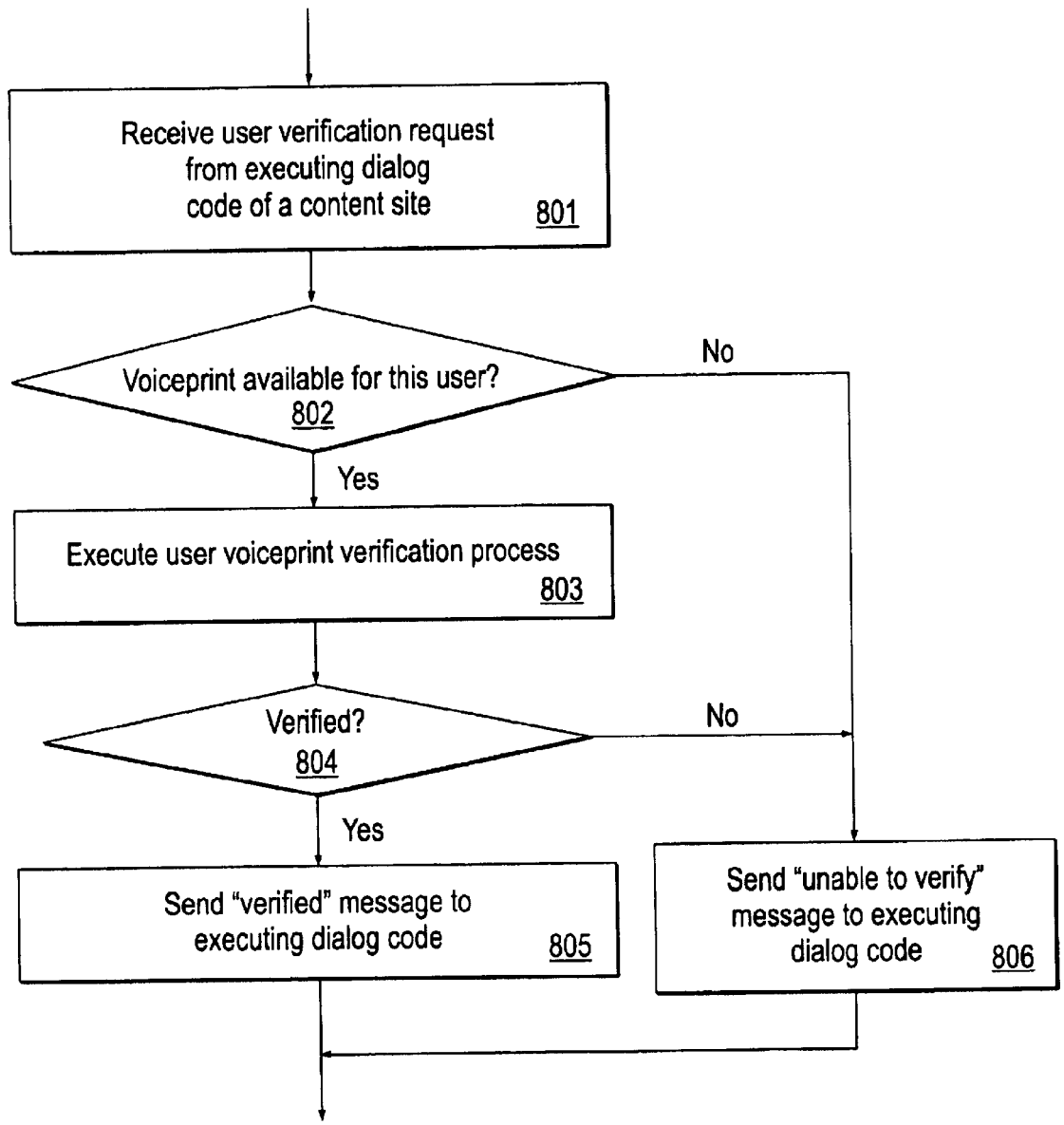
FIG. 8 is a flow chart illustrating a procedure by which the browser may perform speaker verification on behalf of another speech-enabled site on the network.

FIG. 8 is a flowchart showing an example of a process that may be implemented in the browser controller 102 to perform speaker verification on behalf of a remote content site. At block 801, the browser controller 102 receives a user verification request from the locally-executing dialog code of a content site. At block 802, the determination is made of whether a voiceprint is available for the (purported) current user. If so, the user verification process is executed using the appropriate voiceprint for the current user at block 803. Otherwise, at block 806 an "unable to verify" message is provided to the executing code from the content site. Upon executing the verification process, if the user is verified at block 804, then at block '805 a "verified" message is provided to the executing dialog code. If the user cannot be verified, and "unable to verify" message is provided to the executing code at block 806.

The lookup service 98 (FIG. 1A) of the browser 10 provides a mechanism for content to register information that can later be discovered and consumed by other content. A simple form of data exchange involves the sharing of a Java object between code from different content sites. An example of such an object is the Itinerary object mentioned in the sample dialog above. This mechanism allows the browser 10 to function as a broker on behalf of content sites on the network. In particular, the browser 10 may function as a data broker, a service broker, a target broker, or a profile broker, and in each case, the browser 10 may be a persistent broker.

Figure 9A:
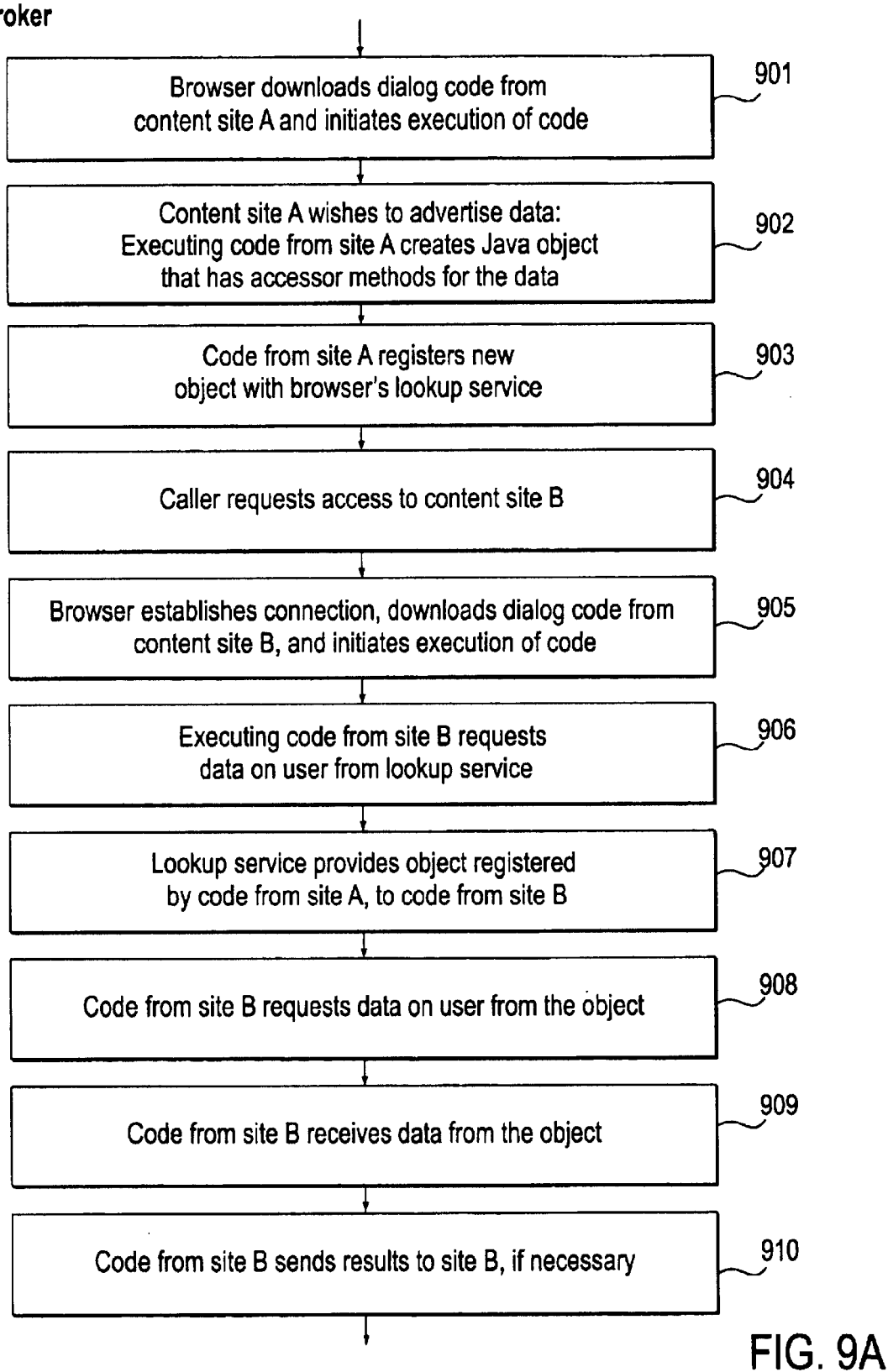
FIG. 9A is a flow chart illustrating operation of the browser as the data broker.

A content site may wish to advertise knowledge (data) to other content sites. Accordingly, FIG. 9A illustrates an example of a process in which the browser 10 functions as a data broker for this purpose. In this example, a content site ("content site A") wishes to advertise data. At block 901, the browser downloads dialog code from content site A and initiates execution of that code. At block 902, the executing code from content site A creates a Java object that has accessor methods for the data. The code from content site A then registers the new object with the browser's lookup service 98 at block 903. At block 904, a caller (user) requests access to another content site, content site B. The browser 10 responds at block 905 by establishing a connection to content site B, downloading dialog code from content site B, and initiating execution of the code. At block 906, the executing code from content site B requests data about the user from lookup service 98. At block 907, the lookup service 98 provides, to the code from content site B, the object that was registered by the code from content site A. The code from content site A then requests data about the user from the object at block 908. At block 909, the code from content site A receives the data from the object and, at block 910, the code from content site B sends results to content site B, if necessary.

Figure 9B:
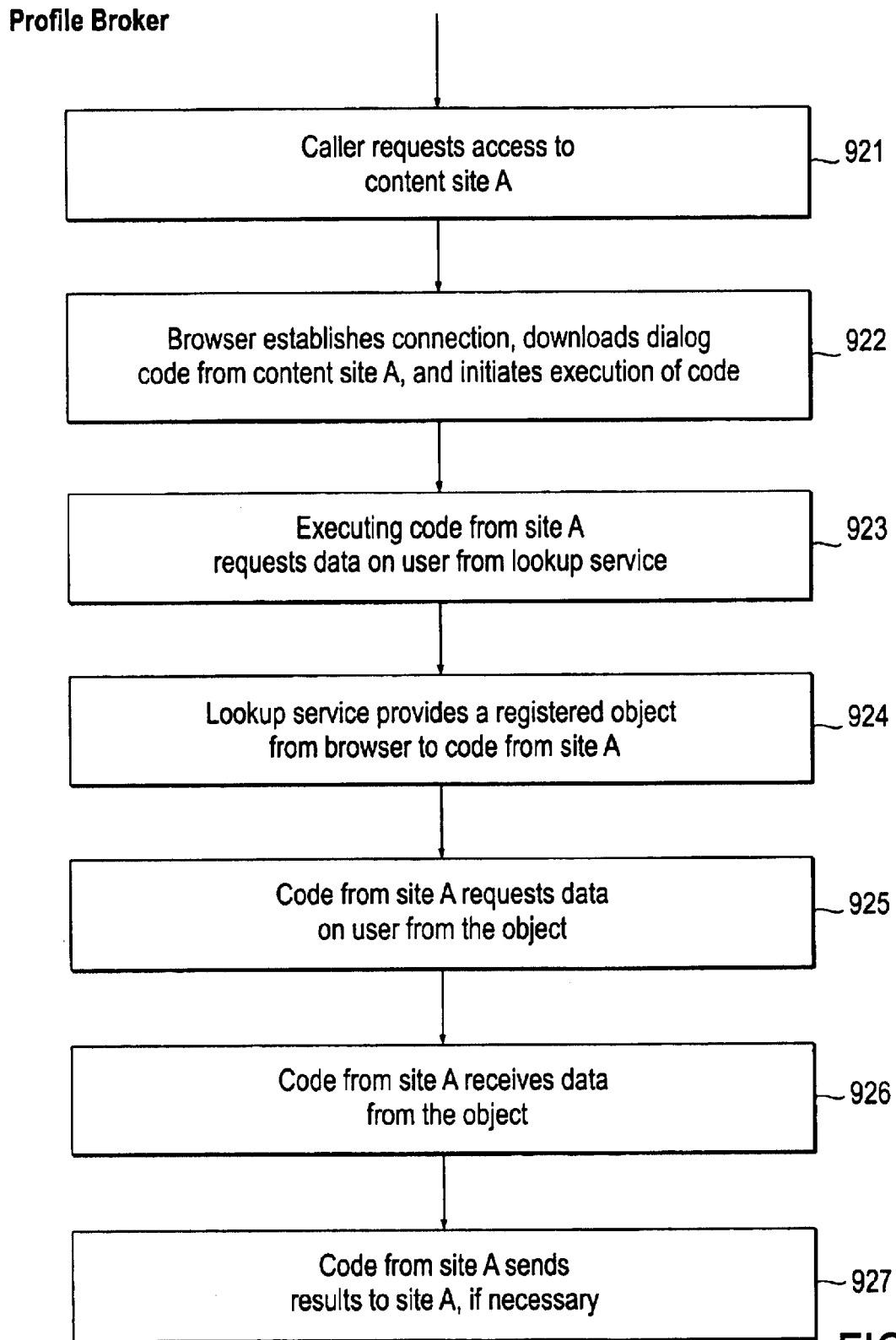
FIG. 9B is a flow chart illustrating operation of the browser as a profile broker.

As noted above, the browser 10 may also maintain user information locally in a user profile (or in other appropriate form) and provide it to a remote content site when needed (as opposed to brokering the information between two remote sites). In that capacity, the browser functions as a profile broker. FIG. 9B illustrates an example of a process in which the browser 10 functions as a profile broker. At block 921, a caller (user) requests access to a content site, content site A. The browser 10 responds at block 922 by establishing a connection to content site A, downloading dialog code from content site A, and initiating execution of the code. At block 923, the executing code from content site A requests data about the user from lookup service 98. At block 924, the lookup service 98 provides a registered object to the code from content site A. The code from content site A then requests data about the user from the object at block 925. At block 926, the code from content site A receives the data from the object (based on a profile for the current user) and, at block 927, the code from content site A sends results to content site B, if necessary.

Figure 10:
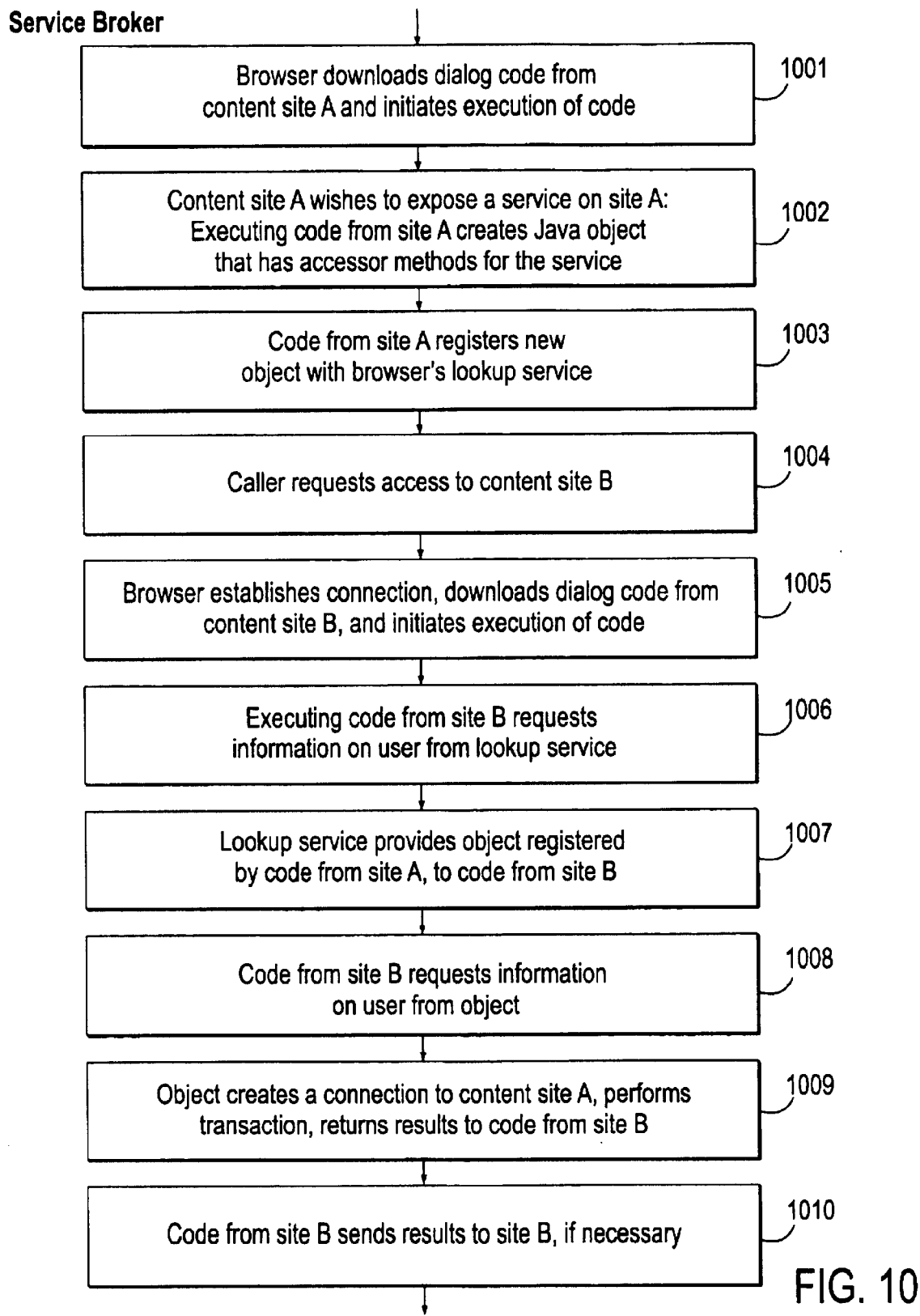
FIG. 10 is a flow chart illustrating operation of the browser as a service broker.

A content site may also wish to expose a service running on its system. Here, information that is registered with the browser 10 takes the form of an object that can perform actions with other systems. Accordingly, FIG. 10 illustrates an example of a process in which the browser 10 functions as a service broker. In this example, content site A wishes to advertise a service that can be used by other content sites. At block 1001, the browser downloads dialog code from content site A and initiates execution of that code. At block 1002, the executing code from content site A creates a Java object that has accessor methods for the service to be advertised. The code from content site A then registers the new object with the browser's lookup service 98 at block 1003. At block 1004, a user requests access to content site B. The browser 10 responds at block 1005 by establishing a connection to content site B, downloading dialog code from content site B, and initiating execution of the code. At block the 1006, the executing code from content site B requests information about the user from lookup service 98. At block 1007, the lookup service 98 provides to the code from content site B the object that was registered by the code from content site A. The code from content site A then requests data about the user from the object at block 1008. At block 1009, the object creates a connection to content site A, performs a transaction, and returns the results to the code from content site B. At block 910, the code from content site B sends results to content site B, if necessary. Of course, variations of the above routine can be used for cases in which the browser 10 maintains the required service locally; the required modifications to the above routine will be readily apparent to those skilled in the art from this description.

Figure 11:
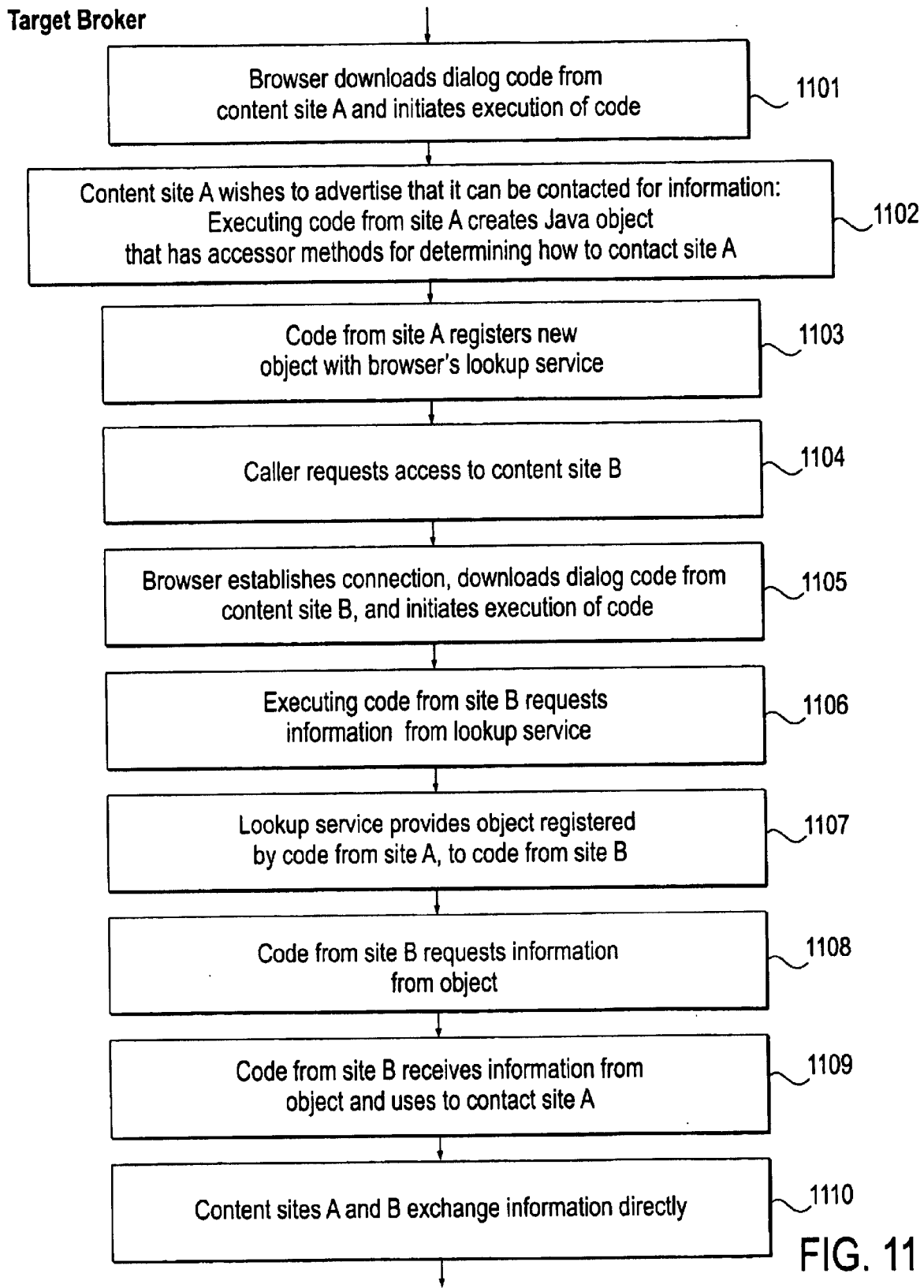
FIG. 11 is a flow chart illustrating operation of the browser as a target broker.

Data exchange may also occur directly between content sites, with the browser 10 merely brokering the knowledge of the content sites' existence, and how to contact each site. In this context, the browser 10 functions as a target broker. FIG. 11 illustrates an example of a process in which the browser 10 functions as a target broker. In this example, content site A wishes to advertise that it can be contacted for information. At block 1101, the browser downloads dialog code from content site A and initiates execution of that code. At block 1102, the executing code from content site A creates a Java object that has accessor methods for determining how to contact content site A. The code from content site A then registers the new object with the browser's lookup service 98 at block 1103. At block 1104, a user requests access to content site B. The browser 10 responds at block 1105 by establishing a connection to content site B, downloading dialog code from content site B, and initiating execution of the code. At block the 1106, the executing code from content site B requests information about the user from lookup service 98. At block 1107, the lookup service 98 provides to the code from content site B the object that was registered by the code from content site A. The code from content site A then requests information about the user from the object at block 1108. At block 1109, the code from content site B receives information from the object and uses it to contact content site A for the information. At block 1110, content site A and content site B exchange information directly.

Figure 12:
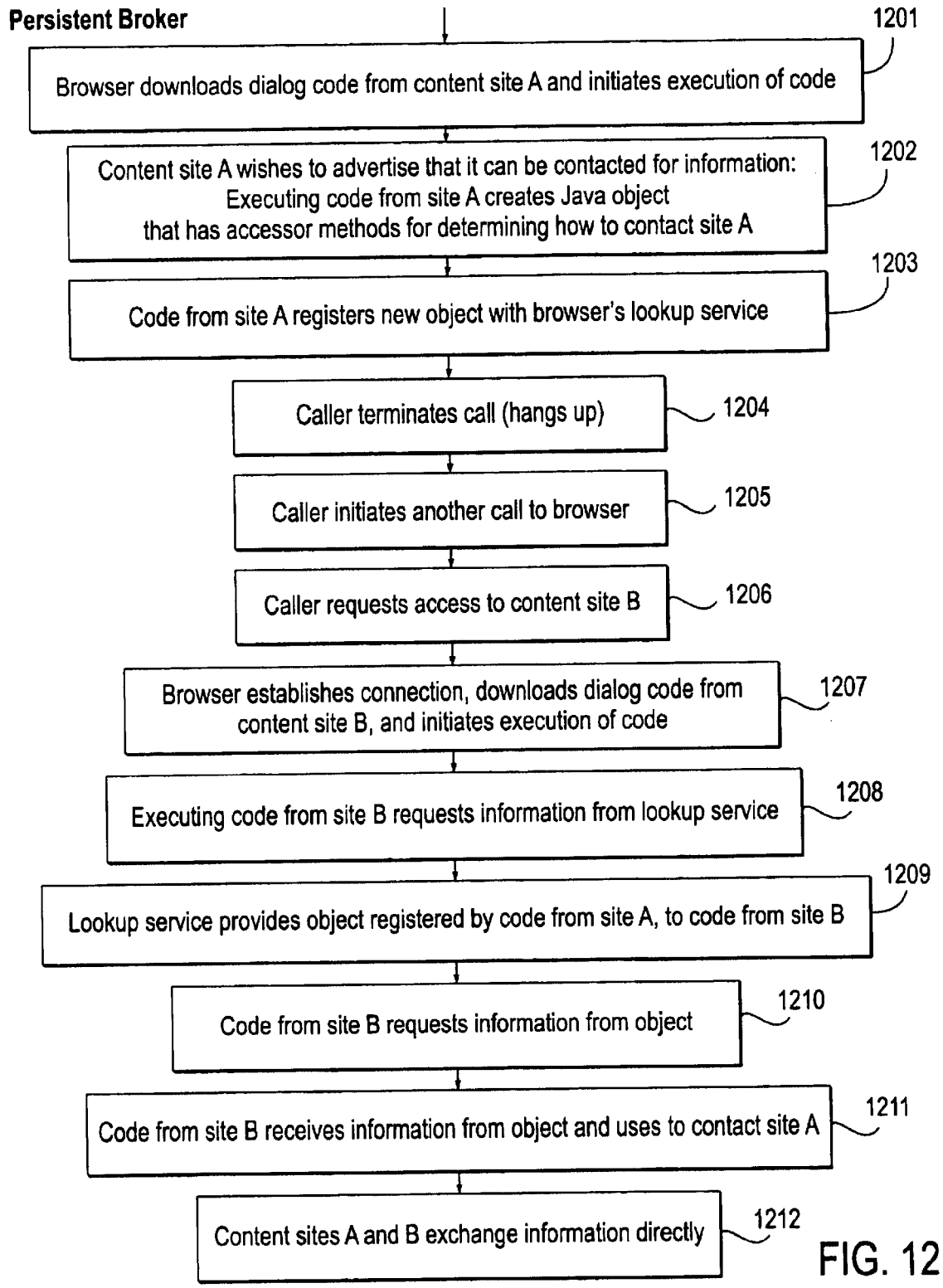
FIG. 12 is a flow chart illustrating operation of the browser as a persistent broker.

Services registered during the course of a call may persist between calls. In this context, the browser 10 acts as a persistent broker. FIG. 12 illustrates an example of a process in which the browser 10 functions as a persistent broker. At block 1201, the browser downloads dialog code from content site A and initiates execution of that code. At block 1202, the executing code from content site A creates a Java object that has accessor methods for determining how to contact content site A. The code from content site A then registers the new object with the browser's lookup service 98 at block 1203. At block 1204, the current user hangs up the telephone to terminate the call.

At block 1205, the user initiates another call to the browser 10 and, at block 1206, the user requests access to content site B. The browser 10 responds at block 1207 by establishing a connection to content site B, downloading dialog code from content site B, and initiating execution of the code. At block the 1208, the executing code from content site B requests information about the user from lookup service 98. At block 1209, the lookup service 98 provides to the code from content site B the object that was registered by the code from content site A. The code from content site A then requests information from the object at block 1210. At block 1211, the code form content site B receives information from the object and uses it to create a connection to content site A. At block 1212, content site A and content site B exchange information directly.

Thus, a method and apparatus for optimizing a spoken dialog between a person and a speech-enabled site on a network have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of executing a spoken dialog between a user and a speech-enabled site in a network including a plurality of voice-hyperlinked speech-enabled sites, the method comprising:

acquiring information associated with the user at a first speech-enabled site of the plurality of speech-enabled sites during a first spoken dialog between the user and the first speech-enabled site;

in response to the user initiating a voice hyperlink to access a second speech-enabled site of the plurality of speech-enabled sites, providing the information associated with the user to the second speech-enabled site; and optimizing a second spoken dialog between the user and the second speech-enabled site by applying the information associated with the user to reduce a number of states of the second spoken dialog.

2. A method as recited in claim 1, wherein said optimizing the second spoken dialog comprises using the information associated with the user to reduce a number of items of information the user is required to speak during the second spoken dialog.

3. A method as recited in claim 1, wherein said optimizing the second spoken dialog comprises using the information associated with the user to reduce the length of the second dialog.

4. An apparatus configured to allow a user to interactively browse a telephony-based network, the apparatus comprising:

means for coupling a user to a first speech-enabled service at a first location on the network;

means for acquiring information associated with the user;

means for outputting an indication audibly detectable by the user, the indication corresponding to a second speech-enabled service at second location on the network:

means for detecting the user speaking an utterance matching the indication;

means for coupling the user to the second speech-enabled service in response to the user speaking an utterance matching the indication; and means for providing the information associated with the user to the second speech-enabled service in response to the user speaking an utterance matching the indication, the information for use by the second speech-enabled service to optimize a spoken dialog between the user and the second speech-enabled service.

5. An apparatus as recited in claim 4, further comprising means for using the information associated with the user at the second speech-enabled site to optimize a spoken dialog between the user and the second speech-enabled site.

6. A system comprising:

a first processing system configured to execute a speech-enabled browser, the browser configured to maintain information associated with a user; and a second processing system coupled on a network to the first processing system and configured to operate as a speech-enabled site, the second processing system configured to in response to receiving an access request from a remote user, transmit a request to the browser for the information associated with the user;

receive the information associated with the user in response to transmitting the request;

apply the information associated with the user to optimize a dialog with the user by reducing the number of required states of the dialog; and execute the optimized dialog with the user.

7. A system as recited in claim 6, wherein the browser is further configured to broker the information for speech enabled sites on the network.

8. A system as recited in claim 7, wherein the browser is configured to broker the information associated with the user by selectively providing the speech-enabled sites with access to the information associated with the user.

9. A system as recited in claim 7, wherein the browser is configured to broker the information associated with the user by verifying access to the information by executing a user verification process.

10. A system comprising:

a first processing system configured to execute a speech-enabled browser, the browser configured to maintain information associated with a user; and a second processing system coupled on a network to the first processing system and configured to operate as a speech-enabled site, the second processing system configured to maintain data for executing a dialog with a user of a third processing system on the network;

receive an access request corresponding to activation of a voice hyperlink by the user;

in response to receiving the access request, transmit a request to the browser for the information associated with the user;

receive the information associated with the user in response to transmitting the request;

use the information associated with the user to optimize the dialog with the user; and execute the optimized dialog with the user.

11. A system as recited in claim 10, wherein the first processing system is configured to broker the information for speech enabled sites on the network.

12. A system as recited in claim 11, wherein the fist processing system is configured to broker the information associated with the user by selectively providing the speech-enabled sites with access to the information associated with the user.

13. A system as recited in claim 12, wherein the first processing system is configured to broker the information associated with the user by verifying access to the information by performing a voiceprint analysis of the user.

* * * * *